United States Patent [19]
Shiomi

[11] Patent Number: 6,035,133
[45] Date of Patent: *Mar. 7, 2000

[54] IMAGE BLUR PREVENTION DEVICE

[75] Inventor: Yasuhiko Shiomi, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/834,128

[22] Filed: Apr. 14, 1997

Related U.S. Application Data

[63] Continuation of application No. 08/679,096, Jul. 12, 1996, abandoned.

[30] Foreign Application Priority Data

Jul. 17, 1995 [JP] Japan ................................. 7-180036
Jul. 28, 1995 [JP] Japan ................................. 7-212699

[51] Int. Cl.[7] .................................................. G03B 17/00
[52] U.S. Cl. .............................................................. 396/55
[58] Field of Search ........................ 396/55, 52; 348/208; 359/554–557

[56] References Cited

U.S. PATENT DOCUMENTS

| | | | |
|---|---|---|---|
| 5,175,580 | 12/1992 | Shiomi | 354/410 |
| 5,229,603 | 7/1993 | Shiomi | 250/231.1 |
| 5,231,445 | 7/1993 | Onuki et al. | 396/55 X |
| 5,615,397 | 3/1997 | Shiomi et al. | 396/55 |

*Primary Examiner*—W. B. Perkey
*Attorney, Agent, or Firm*—Fitzpatrick, Cella, Harper & Scinto

[57] ABSTRACT

Proper image blur prevention is performed when a fluctuation of an optical apparatus (camera) is caused by the operation of a movable member (operation of the shutter of the camera). For this purpose, an image blur prevention apparatus is operated by using both an output signal from a detection device (e.g., a detection system including a vibration gyroscope and the like) and a predetermined signal (e.g., a signal having a predetermined waveform and stored in a memory) so that the image blur caused by a fluctuation due to an operation of the movable member can be properly prevented.

53 Claims, 21 Drawing Sheets

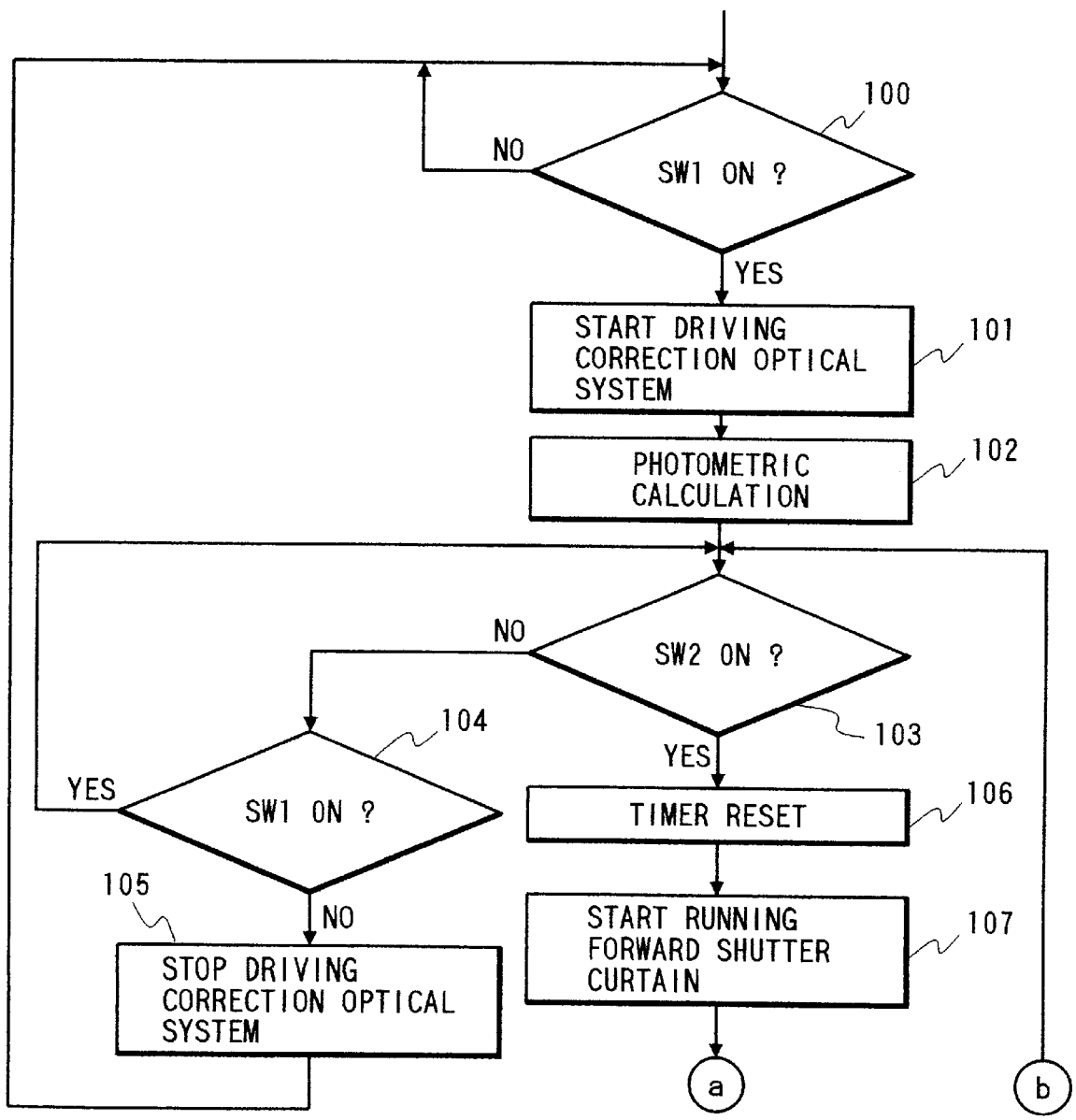

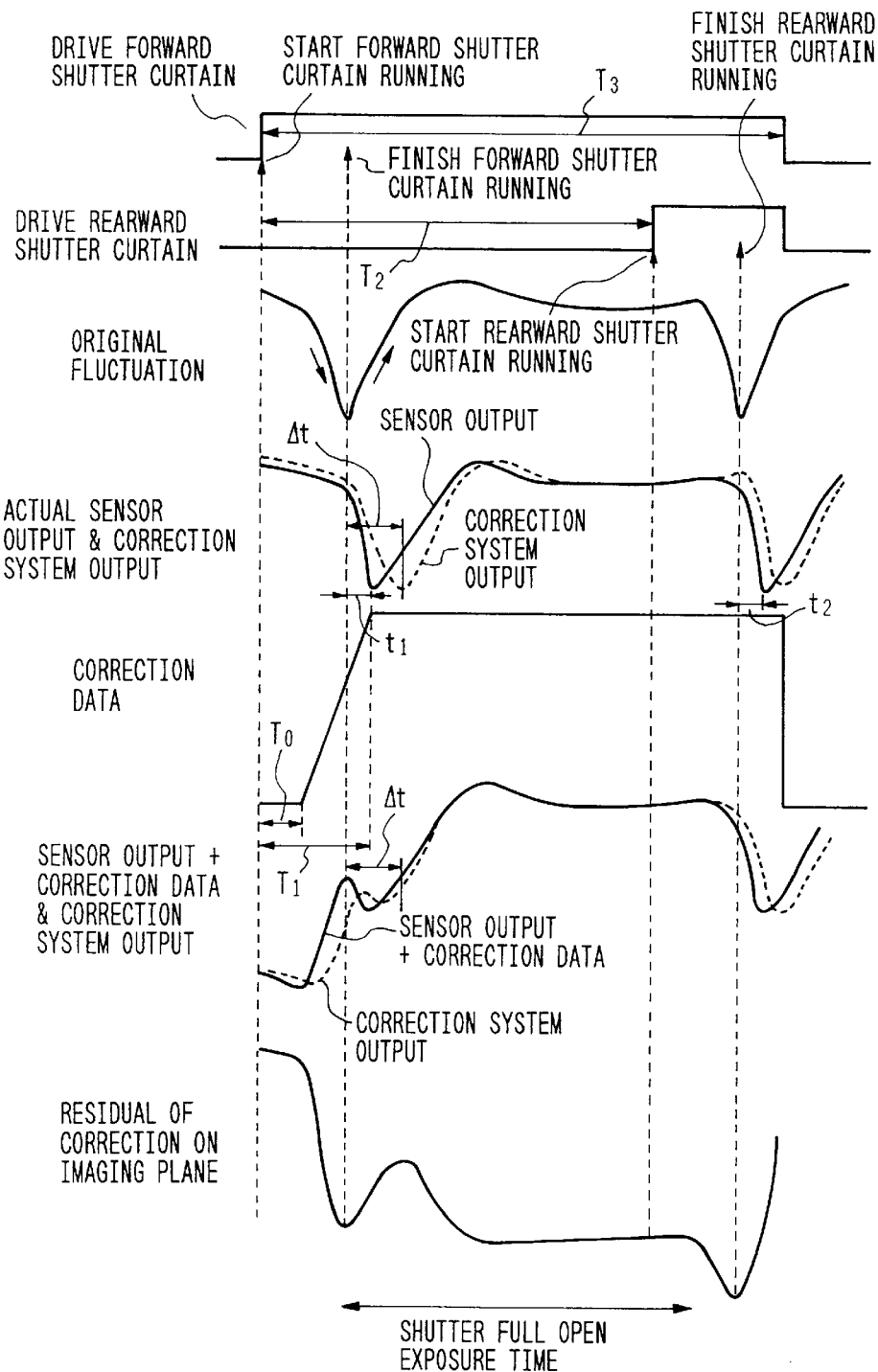

FIG. 6A
DRIVE FORWARD SHUTTER CURTAIN
START FORWARD SHUTTER CURTAIN RUNNING
FINISH FORWARD SHUTTER CURTAIN RUNNING

FIG. 6B
DRIVE REARWARD SHUTTER CURTAIN
START REARWARD SHUTTER CURTAIN RUNNING
FINISH REARWARD SHUTTER CURTAIN RUNNING

FIG. 6C
ORIGINAL FLUCTUATION

FIG. 6D
ACTUAL SENSOR OUTPUT & CORRECTION SYSTEM OUTPUT

FIG. 6E
CORRECTION DATA
$T_0$
$T_1$
4D

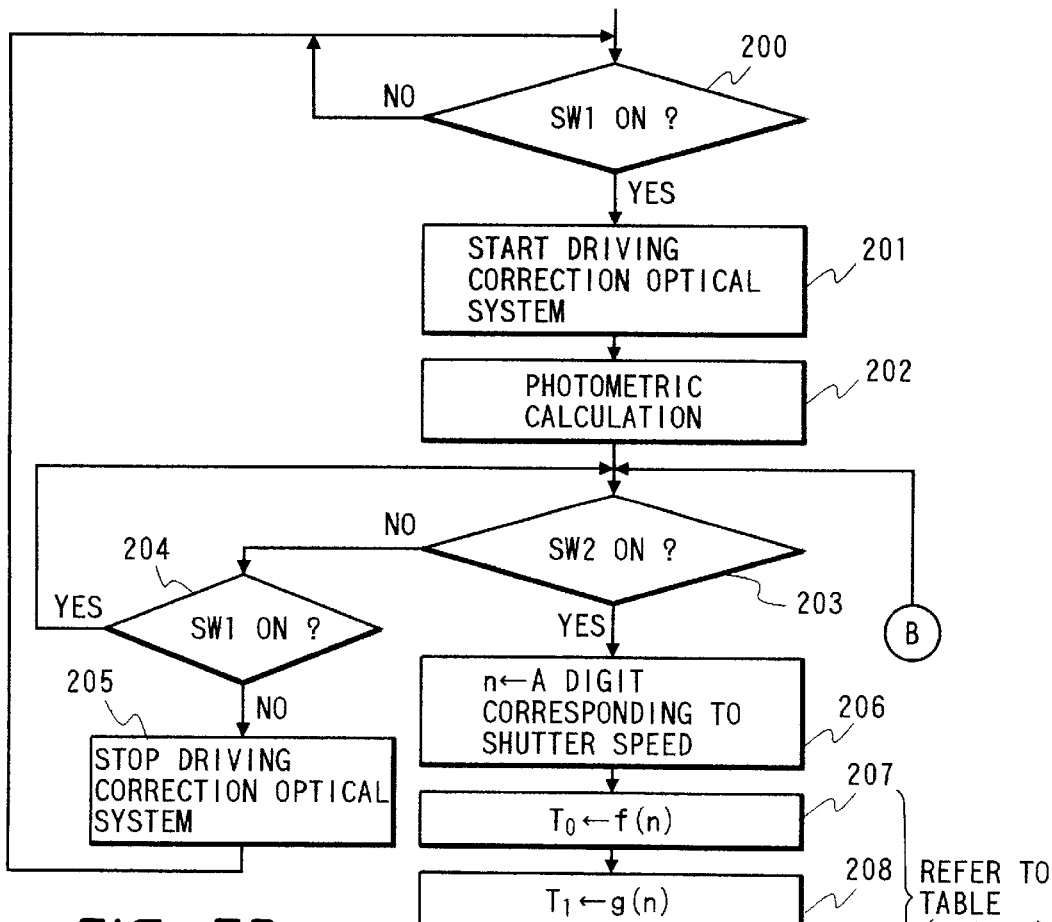
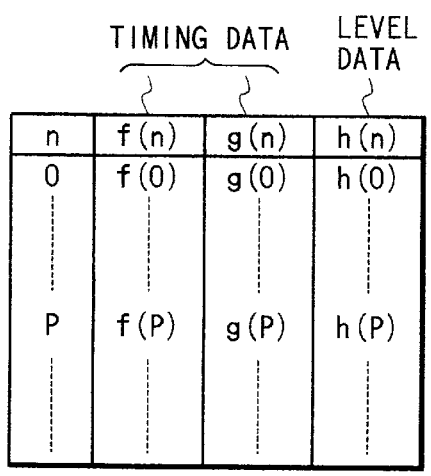
FIG. 7A
FIG. 7B

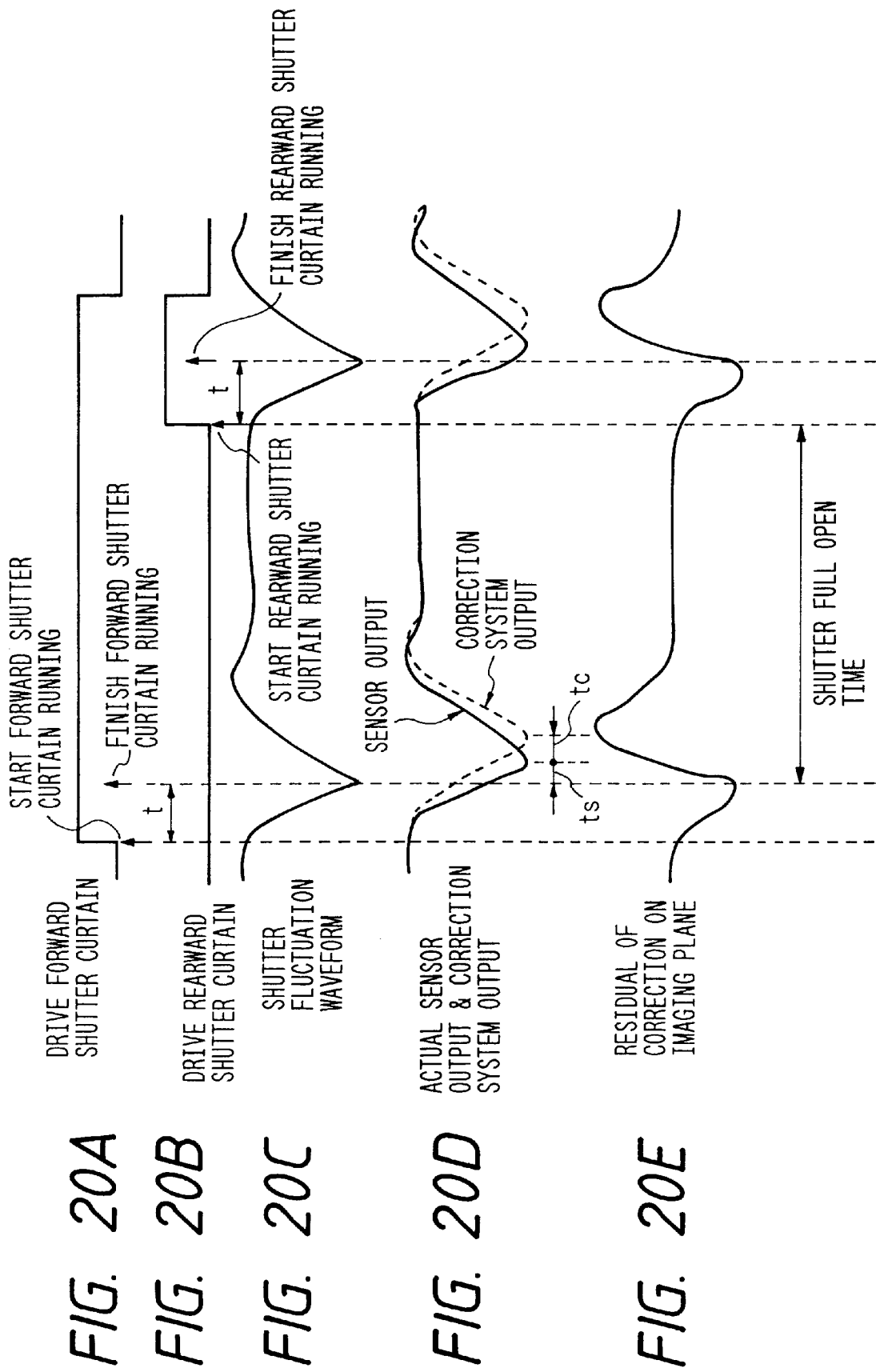

IMAGE BLUR PREVENTION DEVICE

This application is a continuation of Application Ser. No. 08/679,096 filed Jul. 12, 1997.

BACKGROUND OF THE INVENTION

1. Field of the Invention

The present invention relates to an image blur prevention device for preventing image blur caused by hand fluctuation or the like in a camera, an optical device, or the like.

2. Related Background Art

As shown in FIG. 19, according to a conventional image blur prevention device of this type, in a camera body 600, sensors 601 and 602 are arranged to detect rotational fluctuations around two perpendicular axes, i.e., Y- and P-axes, parallel to the film surface of the camera. A correction optical system is driven by predetermined drive means 603 and 604 on the basis of outputs from these two sensors so as to reduce an image fluctuation (caused by hand fluctuation of the photographer) caused on an imaging plane 606.

In general, the hand fluctuation frequency of a photographer is about 20 Hz at most. An existing sensor (e.g., a vibration gyroscope) and correction optical system (e.g., a shift optical system to be described later) can satisfactorily follow such a frequency.

In a camera or the like having a focal-plane photographic shutter, however, a frequency of about 100 Hz (this frequency is determined by the curtain travel of the shutter, i.e., a fluctuation period is determined by the start and finish of shutter curtain running) is generated by forward and rearward shutter curtain running. That is, an existing sensor and correction optical system cannot satisfactorily follow such a frequency.

FIGS. 20A to 20E show fluctuation waveforms generated upon driving of a focal-plane photographic shutter generally used in a single-lens reflex camera.

As shown in FIG. 20A, first of all, driving of the forward shutter curtain is started, and the camera is moved in the opposite direction to the moving direction of the forward shutter curtain (the shutter generally runs in a vertical direction) owing to the action/reaction relationship. As shown in FIG. 20C, a downward fluctuation appears. When a time t has elapsed since the start of forward shutter curtain running, the forward shutter curtain running is finished, and the movement of the shutter curtain is stopped. As a result, the camera is moved in the reverse direction, and an upward fluctuation appears, as shown in FIG. 20C.

Since the running time of this shutter curtain is generally several msec, a fluctuation frequency generated by this shutter curtain running is several 10 to several 100 Hz. In general, a fluctuation sensor used to detect a hand fluctuation cannot accurately detect a frequency near 100 Hz. For this reason, as indicated by the solid line in FIG. 20D, the peak of a sensor output waveform delays with respect to the peak of an original fluctuation waveform by a time ts. In addition, a correction system driven to actually correct a fluctuation on an imaging plane on the basis of an output from the above fluctuation sensor exhibits a correction band of about 10 to 100 Hz at most. For this reason, with regard to a fluctuation signal based on a sensor output near 100 Hz, the peak of a correction-system output waveform delays with respect to the peak of a sensor output waveform by a time tc, as shown in FIG. 20D.

As described above, with respect to a fluctuation signal of about 100 Hz, an actual correction operation is executed with a considerable delay. For this reason, as indicated by the actual fluctuation waveform on the imaging plane in FIG. 20E, the fluctuation is not decreased but is increased by this delayed correction. FIG. 20B shows how the rearward shutter curtain is driven to run with a delay corresponding to a shutter time set with respect to the start of driving of the forward shutter curtain. As in the case of the forward shutter curtain, it takes several msec to complete rearward shutter curtain running from the start of running to the finish of running. The resultant fluctuation waveform is therefore represented by a signal of several 100 Hz, and a residual of fluctuation correction similar to the one described above occurs. However, this rearward shutter curtain fluctuation does not adversely affect actual exposure processing on the film surface, the influence of the rearward shutter curtain fluctuation is smaller than that of the forward shutter curtain fluctuation.

If a fluctuation sensor and a correction system in an interchangeable lens are operated in accordance with a start communication signal from a camera body, general correction of an image blur caused by a hand fluctuation of a photographer can be realized. However, satisfactory image blur correction cannot be performed with respect to a high-frequency fluctuation signal generated upon movement of a mechanical member such as a shutter. Any photographic improvement effect cannot be obtained especially in a case wherein a photographing operation is performed at a set shutter speed, e.g., about 1/60 to 1/250 sec, although it depends on the curtain travel (several msec in general) of a shutter used in the camera.

SUMMARY OF THE INVENTION

According to one aspect of the present invention, there is provided an apparatus including an operation device which causes the image blur prevention device to perform an image blur prevention operation caused by a fluctuation of an optical apparatus due to an operation of a movable member in accordance with an output signal from a fluctuation detection device for detecting a fluctuation state of the optical apparatus and with a predetermined signal. With this arrangement, an image blur caused by a fluctuation of the optical apparatus which is caused by the operation of the movable member can be properly prevented.

According to another aspect of the present invention, there is provided an image blur prevention device or an apparatus or the like adapted thereto, the image blur prevention device prevents an image blur in accordance with an output from a fluctuation detection device for detecting a fluctuation of an optical apparatus. The apparatus comprises a correction device which corrects a time shift of an output signal of the fluctuation detection device when the fluctuation detection device detects the fluctuation of the optical apparatus due to an operation of a movable member. With this arrangement, an image blur prevention operation can be properly performed when the movable member operates.

BRIEF DESCRIPTION OF THE DRAWINGS

FIGS. 4A to 4G are timing charts for explaining the operation of the camera according to the first embodiment of the present invention;

FIGS. 6A to 6E are timing charts for explaining the operation of a camera according to the second embodiment of the present invention;

FIGS. 7A and 7B are flow charts showing the operation of the camera according to the second embodiment of the present invention;

FIGS. 20A to 20E are timing charts for explaining problems posed in the conventional camera.

DETAILED DESCRIPTION OF THE PREFERRED EMBODIMENTS

First Embodiment

Figure 1:
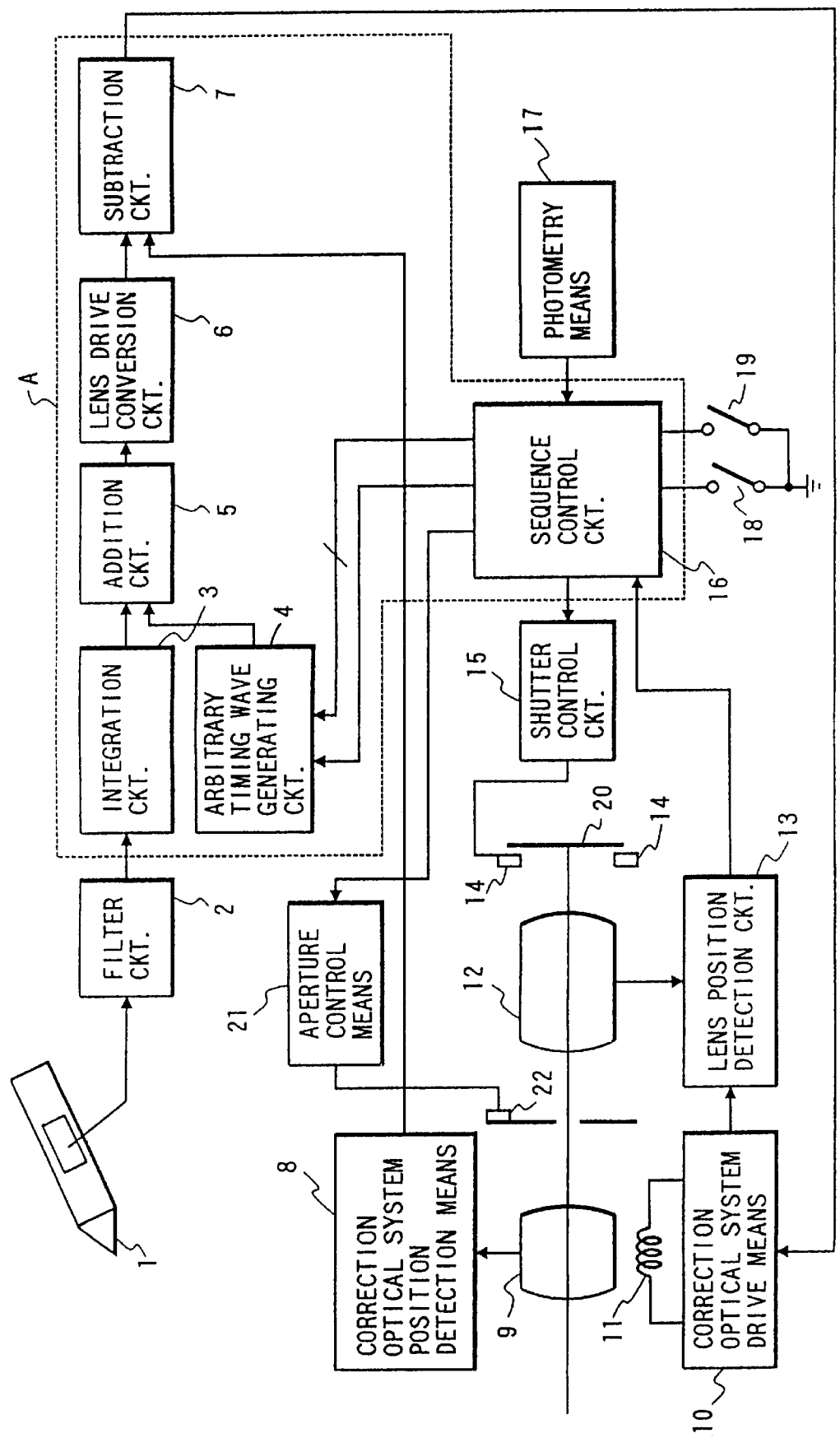
FIG. 1 is a block diagram schematically showing the overall arrangement of a camera according to the first embodiment of the present invention.

FIG. 1 is a block diagram schematically showing the overall arrangement of a camera according to the first embodiment of the present invention. This arrangement will be described below. The outer appearance and the layout of components are the same as those in FIG. 9.

A fluctuation sensor 1 detects an overall fluctuation of a camera. As the fluctuation sensor 1, a vibration gyroscope serving as an angular velocity sensor using a Coriolis force is generally used.

Unnecessary signal components are removed from an output from the fluctuation sensor 1 by a filter circuit 2. The resultant signal is amplified. Thereafter, the signal is input to an integration circuit 3, in which an angular velocity is converted into an angular displacement.

An output from the integration circuit 3 and an output from an arbitrary timing wave generating circuit 4 for generating an arbitrary waveform at a predetermined timing are added together by an addition circuit 5. An output from the addition circuit 5 is converted by a lens drive conversion circuit 6 into a correction system driving amount required for fluctuation correction. This driving amount is then input to one input terminal of a subtraction circuit 7.

The other input terminal of the subtraction circuit 7 is connected to the output terminal of a correction optical system position detection means 8. The detailed structures of a correction optical system 9, a correction optical system drive means 10, and a driving coil 11 used in practice will be described below with reference to FIG. 2.

Figure 2:
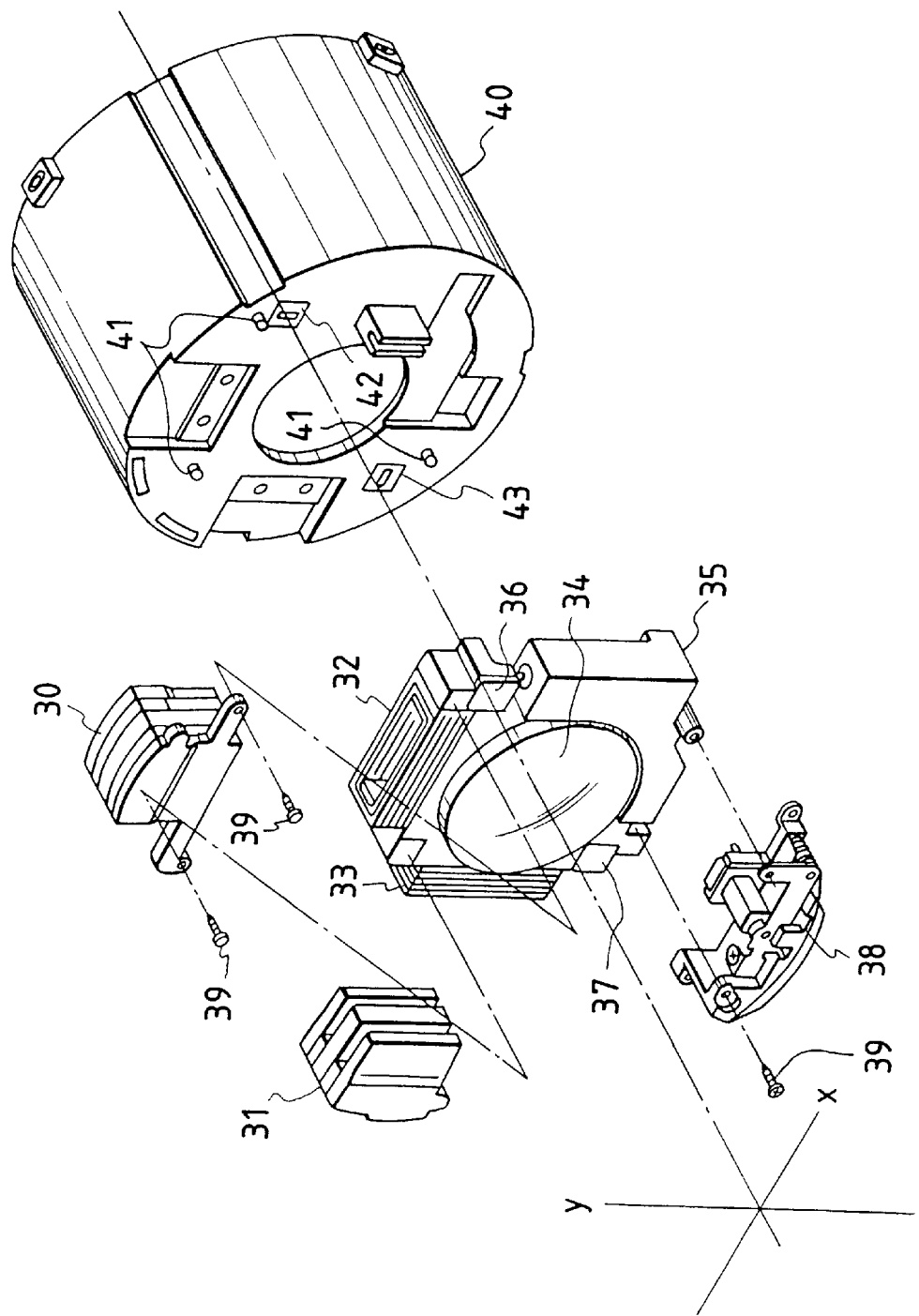
FIG. 2 is a perspective view showing a detailed structure associated with image blur correction in the camera according to the first embodiment of the present invention.

FIG. 2 shows the correction optical system 9 in FIG. 1 and a detailed structure for driving it. The correction optical system shown in FIG. 2 is a shift optical system for offsetting the optical path of light incident on the photographing optical system of the camera by shifting the lens parallel in x and y directions perpendicular to the optical axis. Yoke portions 30 and 31 constitute a magnetic circuit unit serving as an actual driving source in the x and y directions. Coils 32 and 33 are respectively paired with the yoke portions 30 and 31. When necessary power is supplied from the correction optical system drive means 10 to this coil portion shown in FIG. 1, a correction lens 34 as part of the photographing lens is offset in the x- and y-axis directions.

A support frame/support arm 35 serves to fix the correction lens 34. The actual movement of this shift lens is detected in a noncontacting manner by a combination of IREDs 36 and 37 which move integrally with the lens, and PSDs 42 and 43 mounted on a lens barrel unit 40 for holding the overall shift lens.

A mechanical lock mechanism 38 holds the lens at almost the center of the optical axis when energization to this shift system is stopped. This structure also includes charge pins 39 and support balls 41 as tilt stoppers for restricting the movement of this shift system in the tilting direction.

As described above, the movement of the correction optical system driven to perform image blur correction becomes an input to the subtraction circuit 7 via the correction optical system position detection means 8. The subtraction circuit 7 executes subtraction of the input and a signal input from the above sensor. The resultant signal becomes a driving signal input to the correction optical system 9 via the correction optical system drive means 10. As a result, the correction optical system 9 is driven in accordance with the sensor output. An image formed on a film surface 20 via the correction optical system 9 and a photographic optical system 12 is kept at almost the same position without being influenced by a hand fluctuation of the photographer or the like. In this case, lens position information associated with photographic magnifications for a zooming/focusing operation and the like of the photographic optical system 12 is loaded into a sequence control circuit 16 via a lens position detection circuit 13.

Photometric information from a photometry means 17 loaded into the sequence control circuit 16 upon ON operation of a switch means 18 interlocked with the operation of a SW1 (the first-stroke operation of the release button) of the camera. The information is converted into predetermined shutter speed information. When an actual exposure operation is started upon ON operation of a switch means 19 interlocked with the operation of a SW2 (the second-stroke operation of the release button) of the camera, the running operation of a shutter 14 is performed under the control of a shutter control circuit 15 in accordance with the shutter speed information. A portion A enclosed with the dotted line can be constituted by one CPU.

Figure 3B:
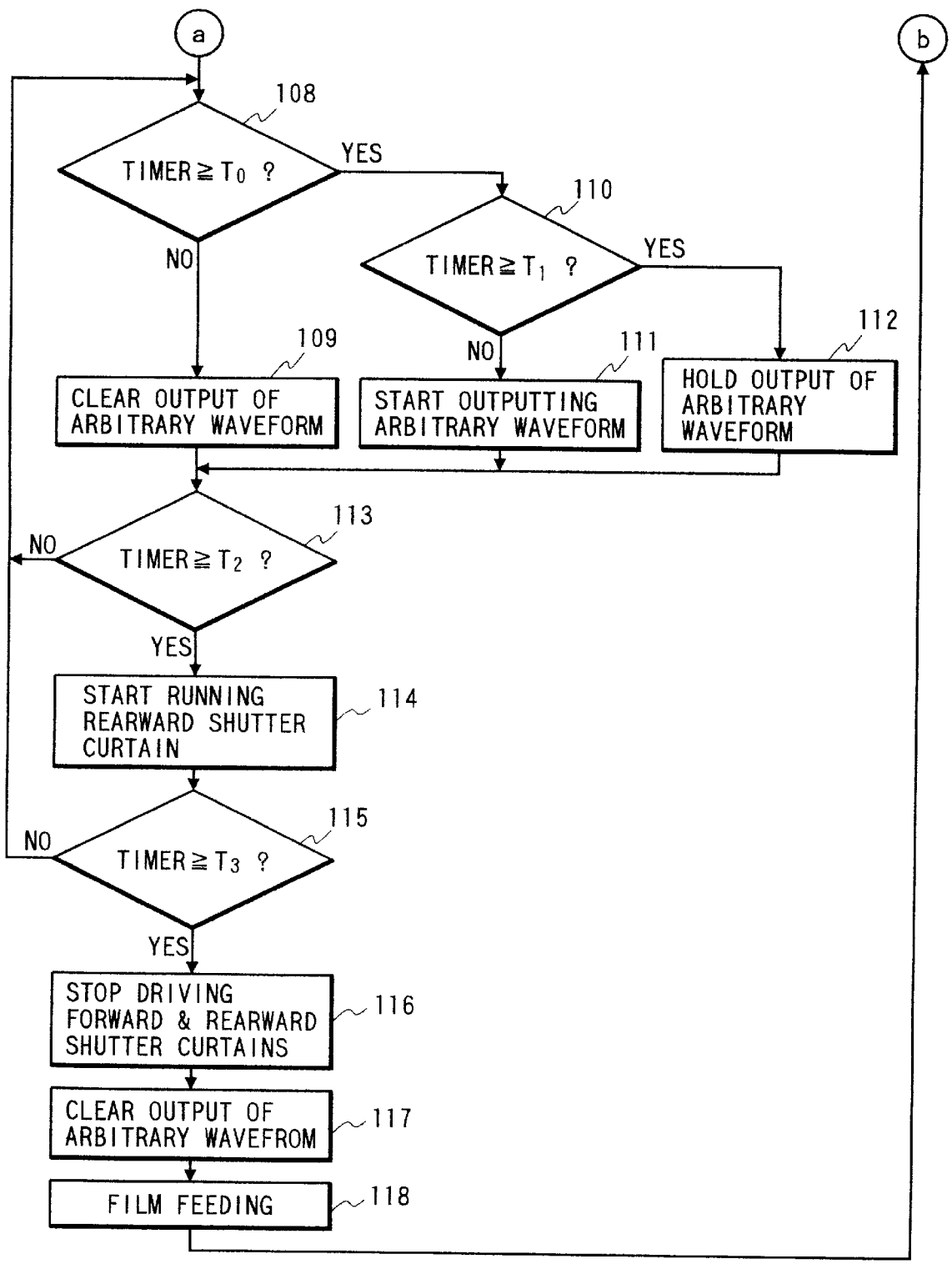
FIG. 3 is comprised of FIGS. 3A and 3B showing a flow chart illustrating the operation of the camera according to the first embodiment of the present invention.

An actual control operation will be described next with reference to the flow chart of FIGS. 3A and 3B and the timing charts of FIGS. 4A to 4G which show the control operation of the sequence control circuit 16.

In step 100 in FIG. 3A, it is checked whether the switch means 18 in FIG. 1 is ON, i.e., the SW1 (for the first-stroke operation of the release button) of the camera is ON. If NO in step 100, this decision step is repeated. If YES in step 100, the flow advances to step 101 to start driving the correction optical system 9 in accordance with an output from the fluctuation sensor 1, as shown in FIG. 1. At this time, therefore, general correction of an image blur caused by a hand fluctuation is performed.

In step 102, an actual F-number and shutter speed for optimal exposure are calculated and determined on the basis of object brightness information from the photometry means 17 in FIG. 1.

In step 103, it is checked whether the switch means 19 in FIG. 1 is ON, i.e., the SW2 (for the second-stroke operation of the release button) of the camera is ON. If NO in step 103, the flow advances to step 104 to determine the state of the SW1 of the camera as in step 100.

If YES in step 104, the flow returns to step 103. If NO in step 104, the flow advances to step 105 to stop driving the correction optical system 9 (in general, the lens is mechanically fixed by the lock mechanism 38 in FIG. 2). At this time, therefore, correction of an image blur caused by a hand fluctuation is stopped.

If it is determined in step 103 that the SW2 of the camera is ON, a timer in the sequence control circuit 16 is reset, and an initializing operation at each timing (to be described later) is performed in step 106. In step 107, driving of the forward shutter curtain of the shutter 14 is started via the shutter control circuit 15.

A fluctuation state in a forward shutter curtain driving operation and the states of a fluctuation signal and the like will be described below with reference to the timing charts of FIGS. 4A to 4G.

FIGS. 4A to 4G are timing charts showing actual fluctuation states upon forward and rearward shutter curtain driving, and variations in fluctuation sensor output and the like. FIG. 4A shows the driven state of the forward shutter curtain. FIG. 4B shows the driven state of the rearward shutter curtain. FIG. 4C shows the actual fluctuation state of the camera. FIG. 4D shows a fluctuation sensor output and the displacement of the correction system. FIG. 4E shows correction data to be described later. FIG. 4F shows a result obtained by adding the fluctuation sensor output and the correction data, and the displacement of the correction system which operates in accordance with the result. FIG. 4G shows the residual of correction on the imaging plane when the correction system operates in the manner shown in FIG. 4F.

As shown in FIG. 4C, when driving/running of the forward shutter curtain is started, a downward fluctuation is generated in the camera body at a speed much higher than that of a hand fluctuation. An upward fluctuation is generated at the same time forward shutter curtain running is finished.

This phenomenon occurs because the camera body is moved by reaction to running and stopping of the forward shutter curtain.

As indicated by solid line in FIG. 4D, the fluctuation generation timing and peak timing of the actual fluctuation sensor output delay with respect to those of the original fluctuation (a delay $t_1$ between the original fluctuation peak and the sensor output peak). This is because the high-frequency performance of the fluctuation sensor itself deteriorates. In addition, the dotted line in FIG. 4D indicates an output from the correction optical system position detection means 8 in FIG. 1 in a case wherein the correction optical system is driven on the basis of this fluctuation sensor output. This waveform indicates a further delay as compared with the fluctuation sensor output. This is because the high-frequency performance of the correction system itself deteriorates.

In step 108, it is checked whether a time $T_0$ has elapsed since the start of forward shutter curtain running. If NO in step 108, the waveform output from the arbitrary timing wave generating circuit 4 is cleared in step 109, and data to be added to the sensor output remains 0.

If it is determined in step 108 that the value of the timer equal to or larger than $T_0$, the flow advances to step 110 to check whether the value of the timer is equal to or larger than $T_1$ ($>T_0$). If No in step 110, the flow advances to step 111, in which an output is generated by the arbitrary timing wave generating circuit 4 as shown in FIG. 4E, and is added to the fluctuation sensor output by the addition circuit 5. In this case, the arbitrary timing wave generating circuit 4a generates an arbitrary waveform which monotonically increases after the lapse of the time $T_0$ at a predetermined gradient.

If it is determined in step 110 that the value of the timer is equal to or larger than $T_1$, an increase in the output from the arbitrary timing wave generating circuit 4 is stopped in step 112. Subsequently, this value is held during an exposure operation. FIG. 4F shows a result obtained by adding such an arbitrary waveform, which exhibits a predetermined monotonical increase and is held at a certain level, to the fluctuation sensor output. As is apparent, in comparison with the case shown in FIG. 4D, correction is made in the opposite direction to the original waveform in FIG. 4C during the interval between the finish of forward shutter curtain running and time $\Delta t$, whereas in the case shown in FIG. 4F, correction is made in the same direction as that of the actual fluctuation in FIG. 4C, although perfect follow-up control is not performed. FIG. 4G shows the final fluctuation amount on the imaging plane which is obtained by such a correction operation. As compared with the case shown in FIG. 4E, although the residual of correction increases before the shutter full opening timing. However, after the shutter full open timing, the residual amount of image blur correction is much smaller than that in the case shown in FIG. 20E. As a result, a reduction in fluctuation in an actual exposure operation can be attained.

Note that the above set times $T_0$ and $T_1$ are set in consideration of the known fluctuation characteristics of the camera, based on shutter curtain running as shown in FIG. 4B, and the known response delay characteristics of the fluctuation sensor. In this embodiment, for example, the time $T_0$ is set such that when the time $T_0$ has elapsed since the start of forward shutter curtain running, the influence of forward shutter curtain running appears as a fluctuation of the camera. The time $T_1$ is set such that when the time $T_1$ has elapsed since the start of forward shutter curtain running, an output from the fluctuation sensor reaches its peak (i.e., the fluctuation sensor output reaches its peak with a delay corresponding to $t_1$ in FIGS. 4A to 4G with respect to the peak of the fluctuation caused by forward shutter curtain running).

Referring to the flow chart of FIGS. 3A and 3B again, it is checked in step 113 whether the value of the timer is equal to or larger than the value of a shutter control time $T_2$ determined by a photometric level. If NO in step 113, the flow returns to step 108. If YES in step 113, the flow advances to step 114 to start running the rearward shutter curtain.

A fluctuation waveform like the one shown in FIG. 4C is generated in the case of rearward shutter curtain running as in the case of forward shutter curtain running. However, since the direction of this fluctuation coincides with the closing direction of the shutter curtain, the influence of the fluctuation on an actual exposure operation is smaller than that of the fluctuation caused in forward shutter curtain running. In this embodiment, therefore, no correction is performed in rearward shutter curtain running. As is apparent however, if fluctuation sensor output correction is performed in the same manner as in the case of rearward shutter curtain running, a further improvement in image blur prevention can be expected.

In step 115, it is checked whether the value of the timer is equal to or larger than $T_3$. If YES in step 115, the flow advances to step 116 to stop energization to the actuators for driving the forward and rearward shutter curtains under the control of the shutter control circuit 15.

In step 117, the output from the arbitrary timing wave generating circuit 4 is cleared to 0. As a result, addition of correction data in the addition circuit 5 is stopped. When the above operation is completed, film feeding is performed by a feeding circuit (not shown) in step 118. When feeding is completed, the flow returns to step 103.

Figure 5A:
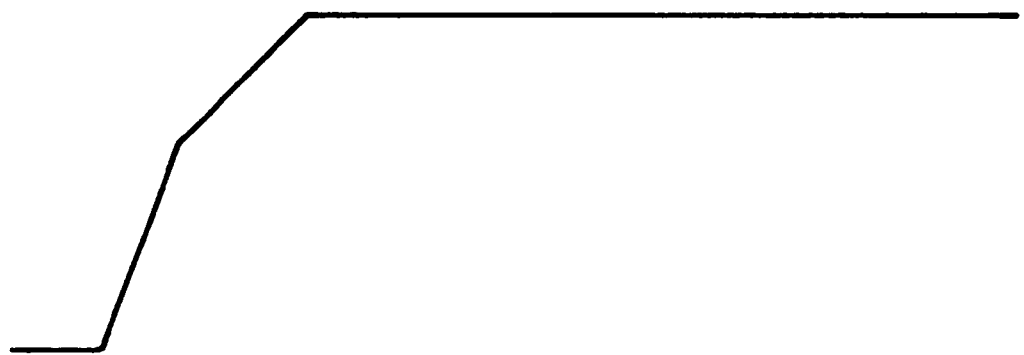
FIGS. 5A and 5B are timing charts for explaining the operation of the camera according to the first embodiment of the present invention.
Figure 5B:
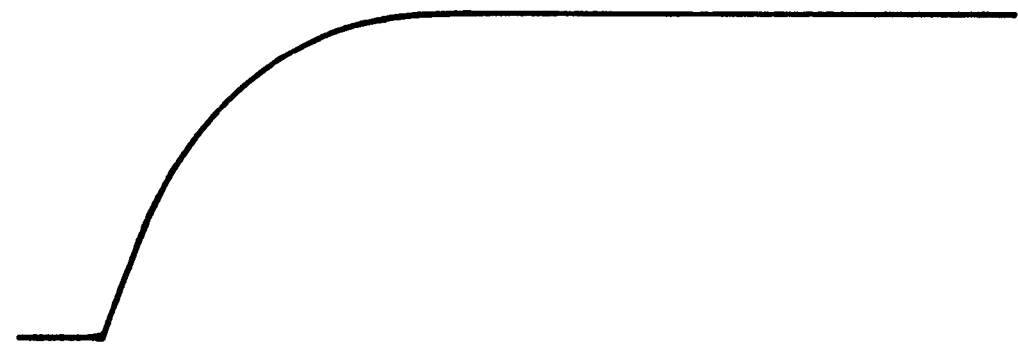

FIGS. 5A and 5B show modifications of the correction data in FIG. 4E. FIG. 5A shows a case wherein the gradient of a straight line changes in two steps (or two or more steps). The first gradient prevents the correction system from moving in the opposite direction to the original fluctuation. The second gradual gradient prevents over-correction caused when the direction of the original fluctuation coincides with the movement of the correction system.

If a curved waveform like the one shown in FIG. 5B, which exhibits an exponential increase, is used, the same effects as described above can be expected.

Second Embodiment

The second embodiment of the present invention will be described next. FIGS. 6A to 6E are timing charts showing an actual fluctuation state upon driving of the shutter, and variations in fluctuation sensor output and the like. FIGS. 6A to 6E correspond to FIGS. 4A to 4E.

FIGS. 6A to 6E show a case wherein the shutter speed is higher than that in the case shown in FIGS. 4A to 4E in the first embodiment. In this case, since the running time of the forward shutter curtain overlaps that of the rearward shutter curtain, the fluctuation waveform shown in FIG. 6C is larger in amplitude than that shown in FIG. 4C. In such a case, the residual of correction on the imaging plane due to a fluctuation sensor output and a delay in a correction system driving operation corresponding to the fluctuation sensor output tends to increase.

As is apparent, since the fluctuation characteristics are based on a shutter driving operation, the fluctuation sensor output, and the delay characteristics of correction optical system driving change depending on the shutter speed, correction data must be changed depending on the shutter speed to be used.

Figure 8:
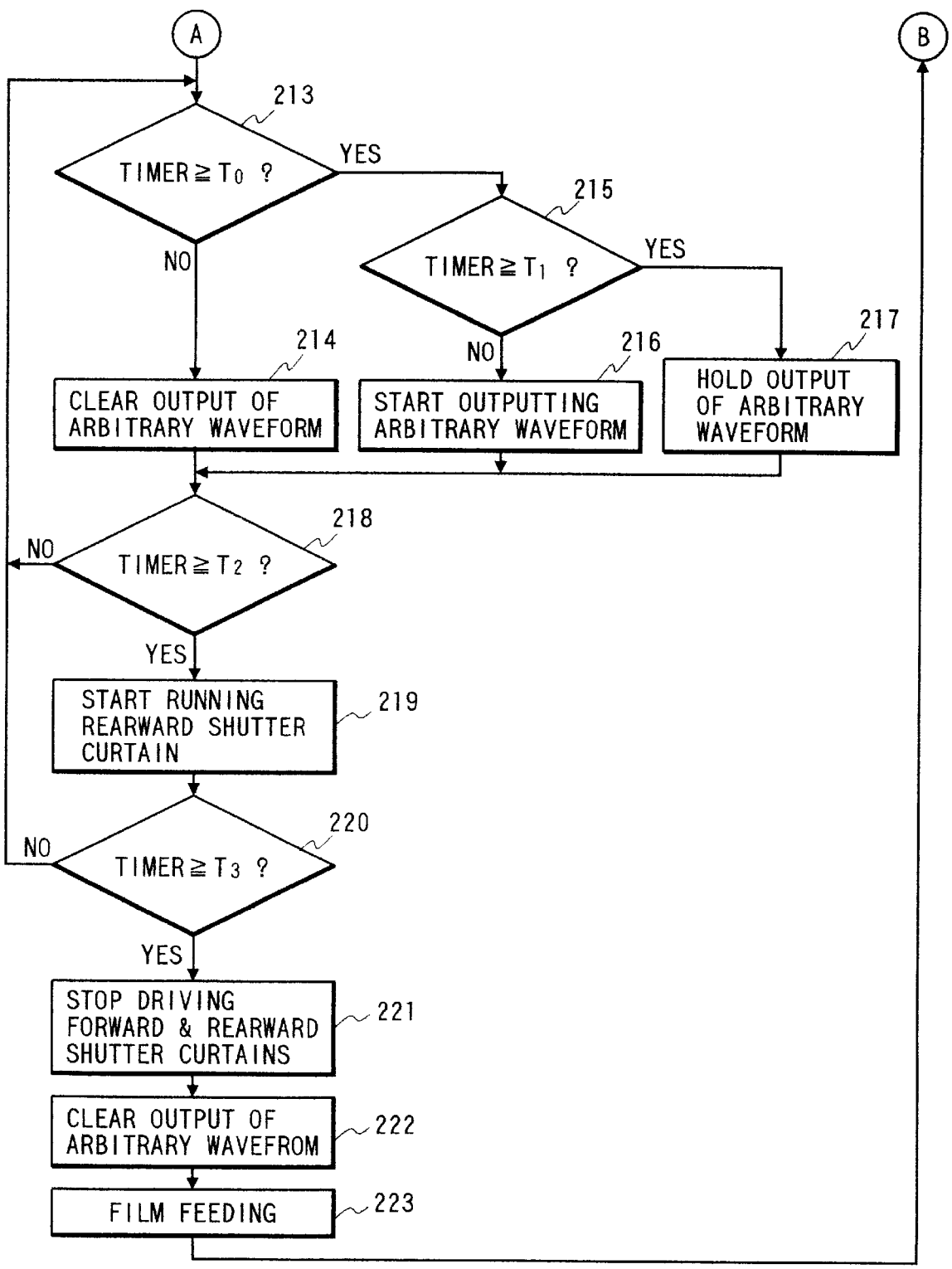
FIG. 8 is a flow chart showing the operation of the camera according to the second embodiment of the present invention.

FIGS. 7A and 8 are flow charts showing a control method to be used when a correction timing method is changed depending on the shutter speed. Since steps 200 to 205 in FIG. 7A are the same as steps 100 to 105 in FIG. 3A, a description thereof will be omitted.

In step 206, a predetermined integer is determined such that, for example, when information corresponding to the shutter speed determined by photometric calculation in step 202 changes, e.g., the shutter speed changes in one step from 1/250 to 1/125, the value of n is incremented by one.

In steps 207 to 209, the parameter values of correction data in which this integer corresponds to n are obtained from a correction data table. In step 207, the value of table data f(n) is transferred, as the value of $T_0$ in the first embodiment, to a register L in the CPU. Similarly, in step 208, the value of table data g(n) is transferred as the value of $T_1$ to the register L. In step 209, an amount h(n) corresponding to a maximum amplitude D of the correction data shown in FIGS. 6A to 6E is transferred to the register L.

In step 210, the value of the register L is transferred to the arbitrary timing wave generating circuit 4 in FIG. 1 to determine a correction data amount to be generated in an actual shutter control operation. An operation during actual exposure is shown in steps 211 to 223. Since this operation is the same as that in steps 106 to 118 in FIGS. 3A and 3B, a description thereof will be omitted.

When data to be corrected in accordance with the shutter speed is changed in this manner, a timing $T_0$ of the leading edge of the waveform, a timing $T_1$ at which an increase/decrease in the amplitude of the waveform stops, and the maximum amplitude D of the waveform change, thereby setting optimal correction data corresponding to the original fluctuation.

In this embodiment, correction data is changed in accordance with only the shutter speed to be used. However, this correction data may be changed in accordance with zooming/focusing information detected by the lens position detection circuit 13 in FIG. 1. This operation is performed to prevent the influence of a shutter fluctuation on the imaging plane from increasing with an increase in zoom focal length. In this case, correction data more similar to a fluctuation waveform than the correction data shown in FIGS. 5A and 5B and the like must be used.

When the diameter of a stop placed in a lens unit is to be controlled via an aperture control means 21 in FIG. 1 in addition to the shutter speed, a fluctuation waveform varies because a stop driving time varies depending on the F-number. For this reason, different correction data may be used depending on the set F-number.

Third Embodiment

Figure 9:
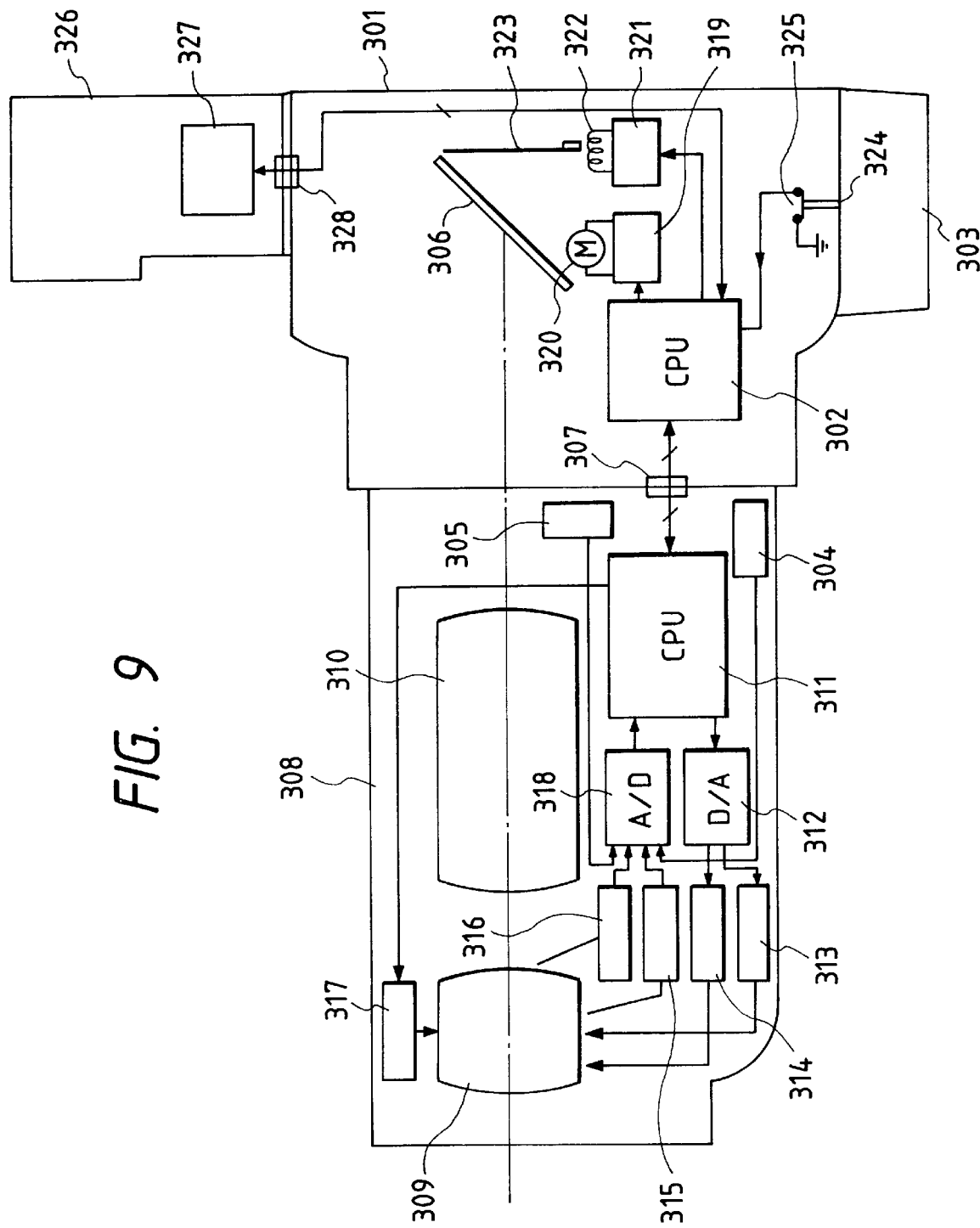
FIG. 9 is a schematic view showing the main part of the third embodiment of the present invention.

FIG. 9 schematically shows the main part of the third embodiment of the present invention. FIG. 9 shows a case wherein an interchangeable lens 308 is mounted in a camera body 301.

In this embodiment, a CPU 302 incorporated in the camera body 301 and adapted to control the overall driving operation of the camera is connected to a CPU (lens-side arithmetic means) 311 in the interchangeable lens 308 via a mount piece portion 307 and a serial communication line. An external power source 303 such as a motor driver and an external battery which is coupled to the camera body 301 via a projection portion (state detection means) 324. A signal indicating the coupled state between the external power source 303 and the camera body 301 is received by the CPU 302 via a switch 325 in the camera body 301.

A main mirror mechanism 306 retreats from a photographing optical path only in an actual photographing operation to guide incident light from an object, which is incident via a main photographic optical system 310, to a film surface. An actual driving operation of the main mirror mechanism 306 is performed by energizing a motor 320 in a predetermined direction via a motor driver circuit 319, which is generally constituted by a transistor bridge and the like, on the basis of a control signal from the motor 320. As a shutter 323, a focal-plane photographic shutter generally used in a single-lens reflex camera is used. Similar to the main mirror mechanism 306, the shutter 323 is driven by supplying a predetermined current to a driving coil 322 via a driving circuit 321 on the basis of a control signal from the CPU 302 so as to perform forward and rearward shutter curtain running.

An external strobe 326 is mounted on the camera body 301. A CPU 327 for controlling the overall operation of the external strobe 326 is connected to the CPU 302 via a contact piece portion (state detection means) 328 of the camera body 301 to perform serial communication and the like.

Two sensors 304 and 305 for detecting the overall fluctuation (vibration) of the camera body 301 and the interchangeable lens 308 are arranged in the interchangeable lens 308 so as to detect angular accelerations, angular velocities, angular displacements, or the like around predetermined rotation axes.

Figure 10:
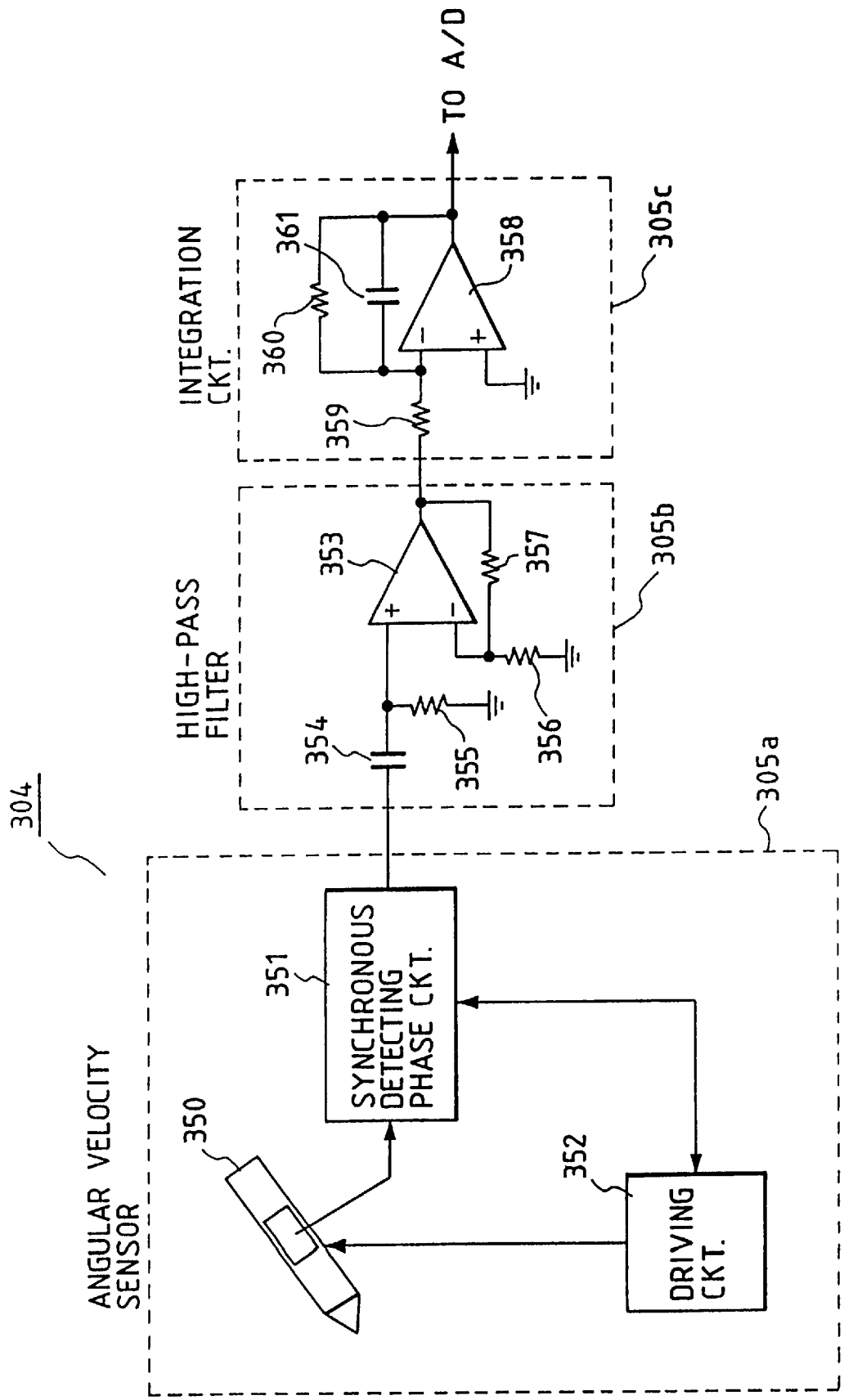
FIG. 10 is a schematic view showing the main part of a sensor 304 in FIG. 9.

FIG. 10 shows the detailed arrangement of an angular velocity sensor called a vibration gyroscope used as an example of the sensor 304 (or 305). Referring to FIG. 10, the sensor 304 includes an angular velocity sensor 305a, a high-pass filter 305b, and an integration circuit 305c. In the angular velocity sensor 305a, first of all, a vibrator 350 is resonated/driven by a driving circuit 352. When a rotation angular velocity is produced around a predetermined axis of the vibrator 350 in this state, an output from the vibrator 350 represents a signal obtained by modulating the rotation angular velocity with the resonant frequency. This modulated signal is demodulated by a synchronous detecting phase circuit 351 with the same frequency as the resonant frequency, thereby extracting only the angular velocity signal.

The output from the angular velocity sensor 305a is input to the high-pass filter 305b. The high-pass filter 305b is constituted by an OP amplifier 353, resistors 355, 356, and 357, and a capacitor 354. The high-pass filter 305b removes unnecessary DC components from the input signal to extract only an accurate angular velocity signal. This output is further input to the integration circuit 305c. The integration circuit 305c is constituted by an OP amplifier 358, resistors 359 and 360, and a capacitor 361. The signal input to the integration circuit 305c is converted from the angular velocity to an angular displacement. The output from the integration circuit 305c is received by the CPU 311 via an A/D converter 318 in FIG. 1.

The correction optical system 309 constituted by the front surface of the main photographic optical system 310 or its portion is driven in a predetermined direction via a D/A converter 312 and driving circuits 313 and 314 on the basis of an output from a fluctuation correction data output means incorporated in the CPU 311. Information of the movement of the correction optical system 309 is loaded into the CPU 311 via position detection sensors 315 and 316 and the A/D converter 318. A mechanical lock mechanism 317 fixes the correction optical system 309 itself near the optical axis while the correction optical system 309 is not driven.

Figure 11:
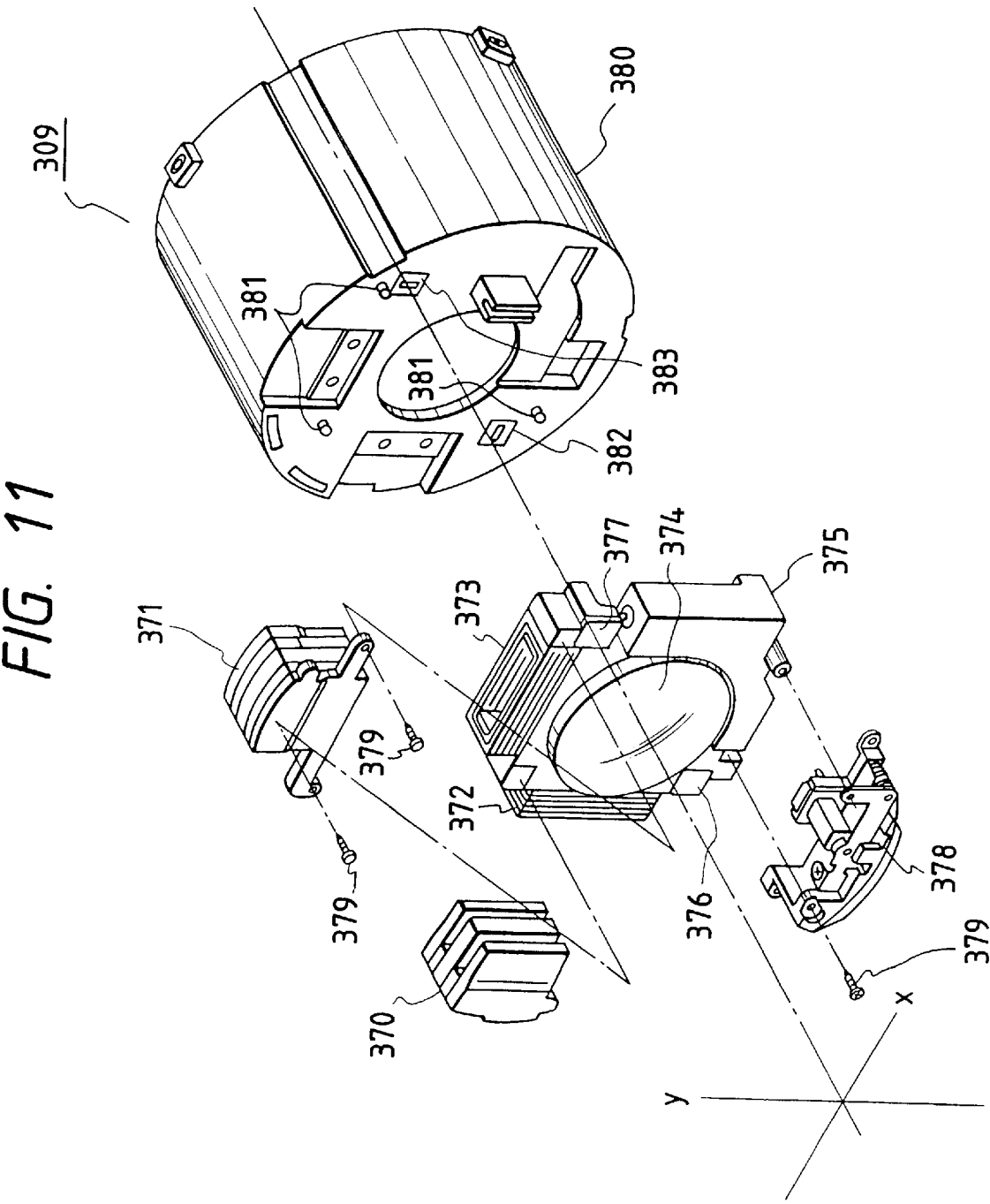
FIG. 11 is a schematic view showing the main part of a correction optical system 309 in FIG. 9.

FIG. 11 shows a case wherein a so-called shift correction optical system, which allows part of a lens group to freely move on a plane perpendicular to the optical axis, is used as an example of the correction optical system 309. Referring to FIG. 11, yoke portions 370 and 371 constitute part of a magnetic circuit unit for realizing an actual offset driving operation in the x- and y-axis directions. Driving coils 372 and 373 are respectively paired with the yoke portions 370 and 371. A shift lens 374 is driven by supplying currents to the driving coils 372 and 373 via the driving circuits 313 and 314. The actual movement of the shift lens 374 is optical/electrically detected, in a noncontacting manner, by a combination of IREDs 376 and 377 which move integrally with the shift lens 374, and PSDs (position detection elements) 382 and 383 fixed to a lens barrel unit 380 holding the overall shift lens 374. A mechanical lock mechanism 378 is identical to the mechanical lock mechanism 317 described above, and serves to mechanically stop the movement of the correction optical system 309. This structure also includes an arm portion 375 of the shift lens 374, charge pins 379 of the yoke portion 370 and the mechanical lock mechanism 378, and support balls 381 serving as tilt stoppers for restricting the movement of the shift lens 374 in the tilting direction.

A driving operation in this embodiment will be described next with reference to the flow charts of FIGS. 12 to 14.

Figure 12:
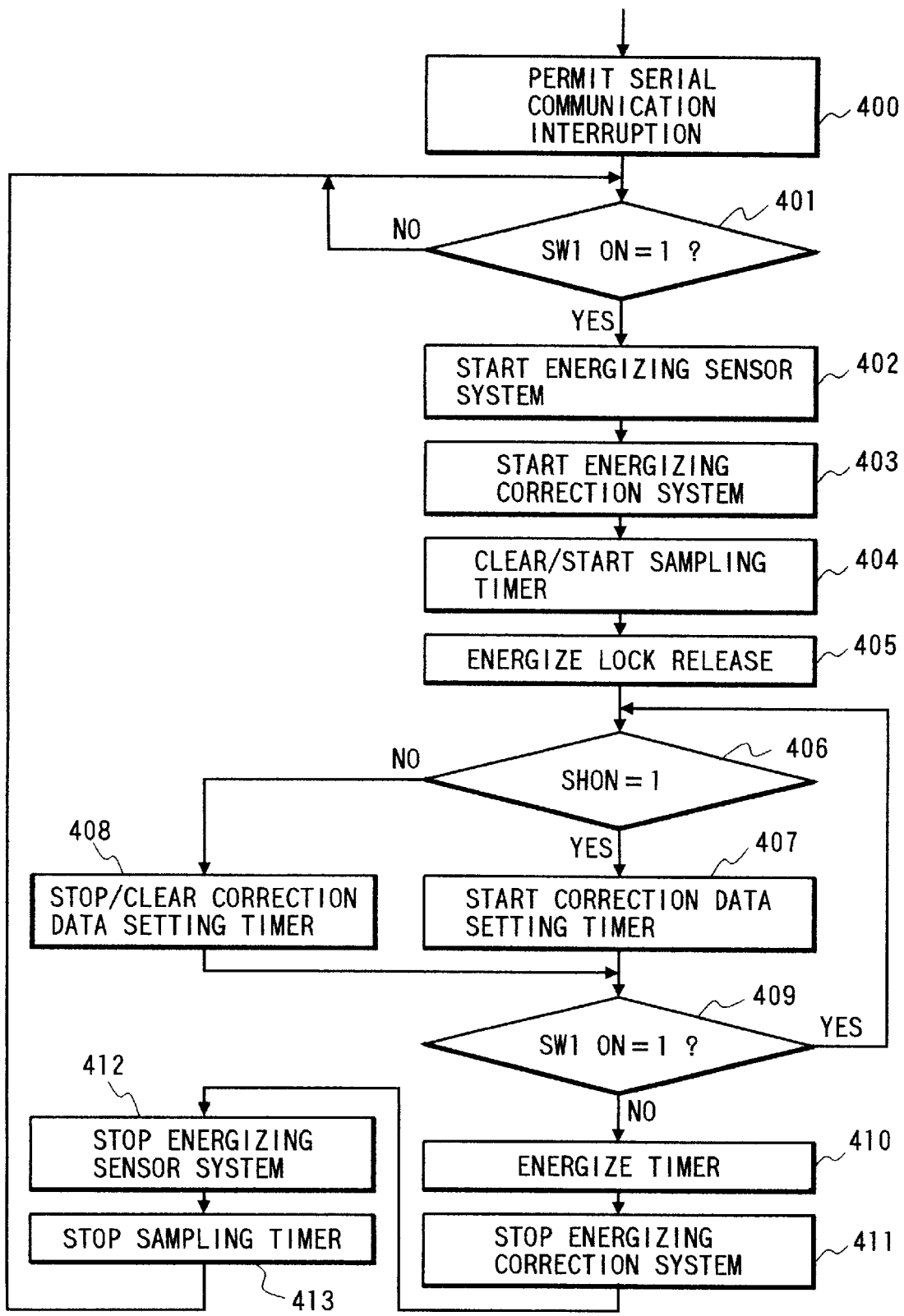
FIG. 12 is a flow chart showing the operation of an arrangement according to the third embodiment of the present invention.
Figure 15:
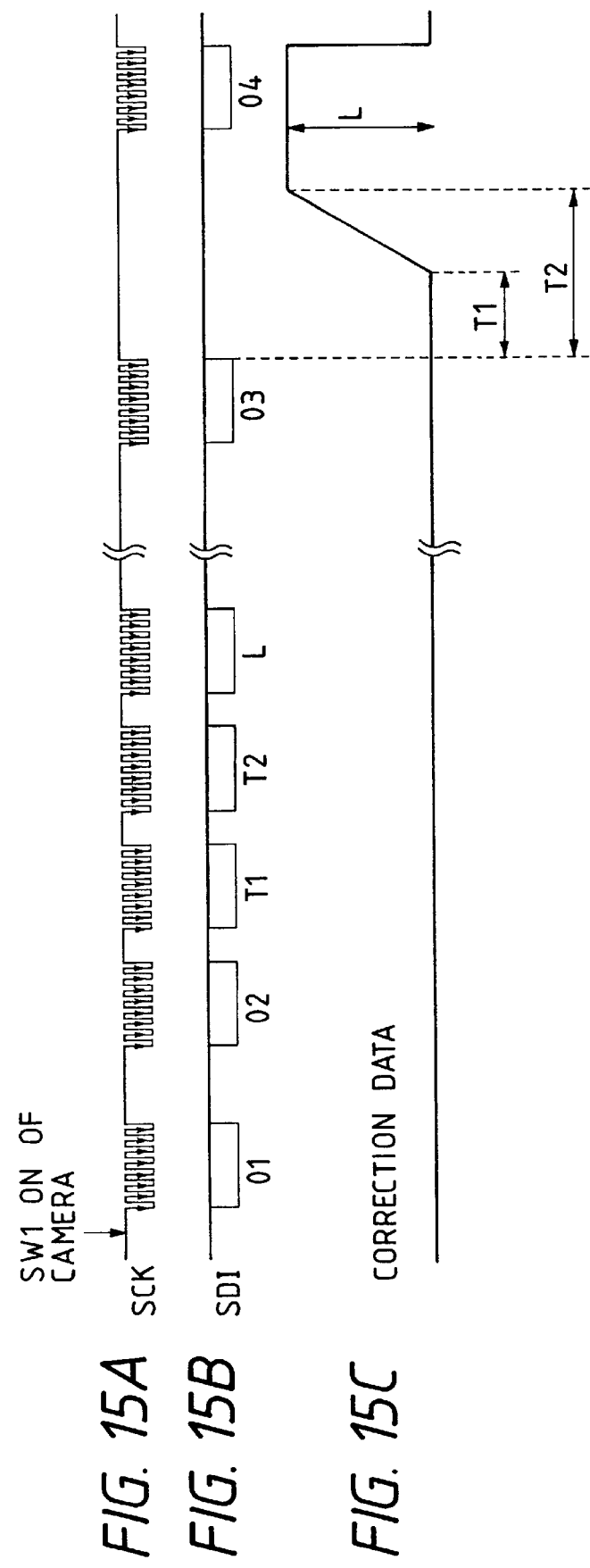
FIGS. 15A to 15C are timing charts showing operation of the arrangement according to the third embodiment of the present invention.

FIG. 12 is a main flow chart showing the operation of the CPU 311 on the interchangeable lens 308 side. In step 400, serial communication interruption is permitted to receive an instruction and data from the CPU 302 on the camera body side. Subsequently, a serial communication interruption operation like the one shown in FIG. 13 is performed every time a signal like the one shown in FIG. 15A is received from the camera body 301. In step 401, it is checked whether a flag SW1ON in the CPU 311 is "1". If NO in step 401, this decision step is repeated.

In this case, as shown in the timing charts of FIGS. 15A to 15C, when the SW1 of the camera body 301 is turned on by the photographer, a command "01" is transmitted from the CPU 302 to the CPU 311 in synchronism with a signal SCK and received by the CPU 311 via its input SDI. When a predetermined number of clocks (eight clocks in this embodiment) of the signal SCK are input, serial communication interruption is caused in the CPU 311.

Figure 13:
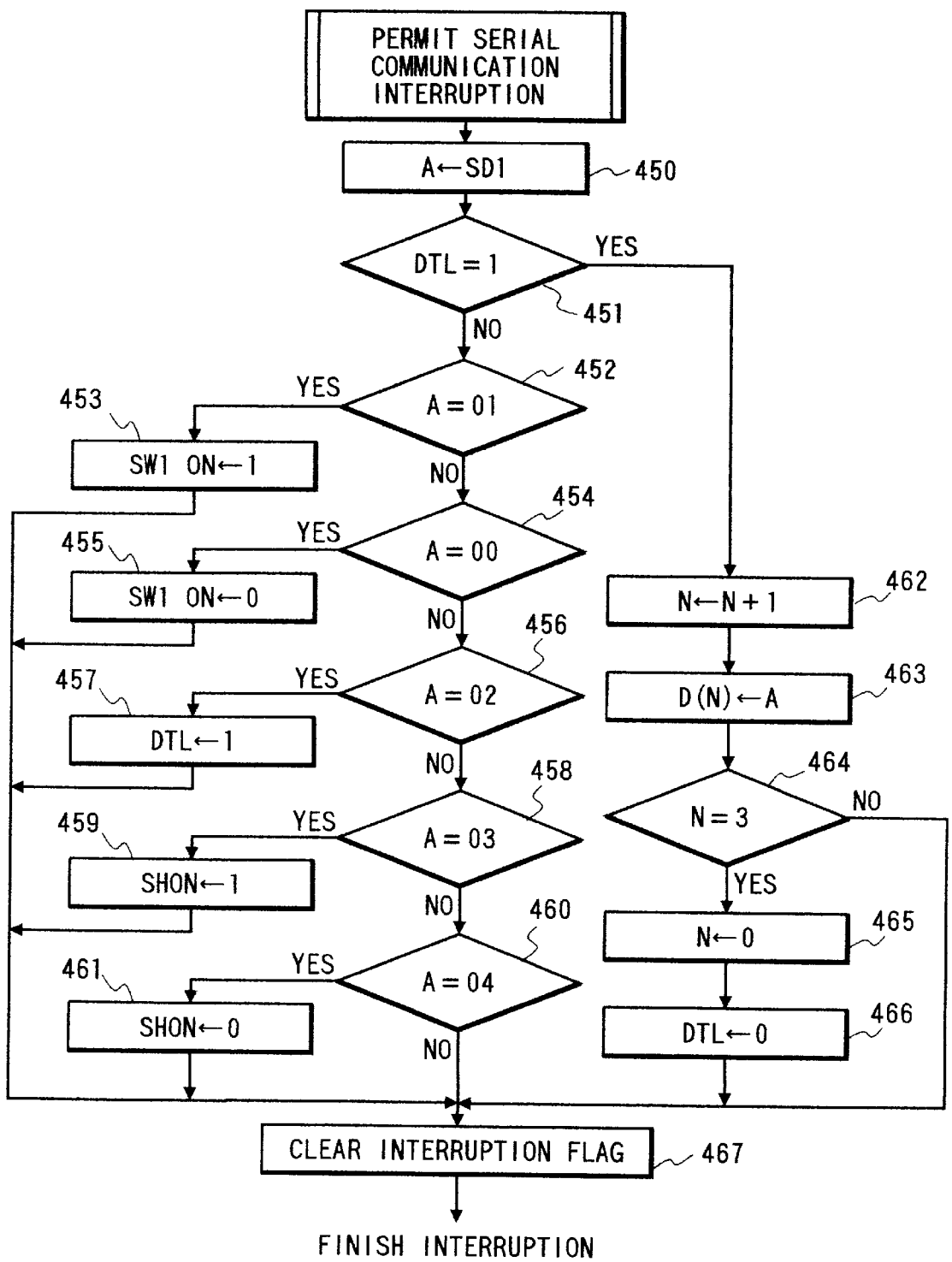
FIG. 13 is a flow chart showing the operation of the arrangement according to the third embodiment of the present invention.
Figure 14:
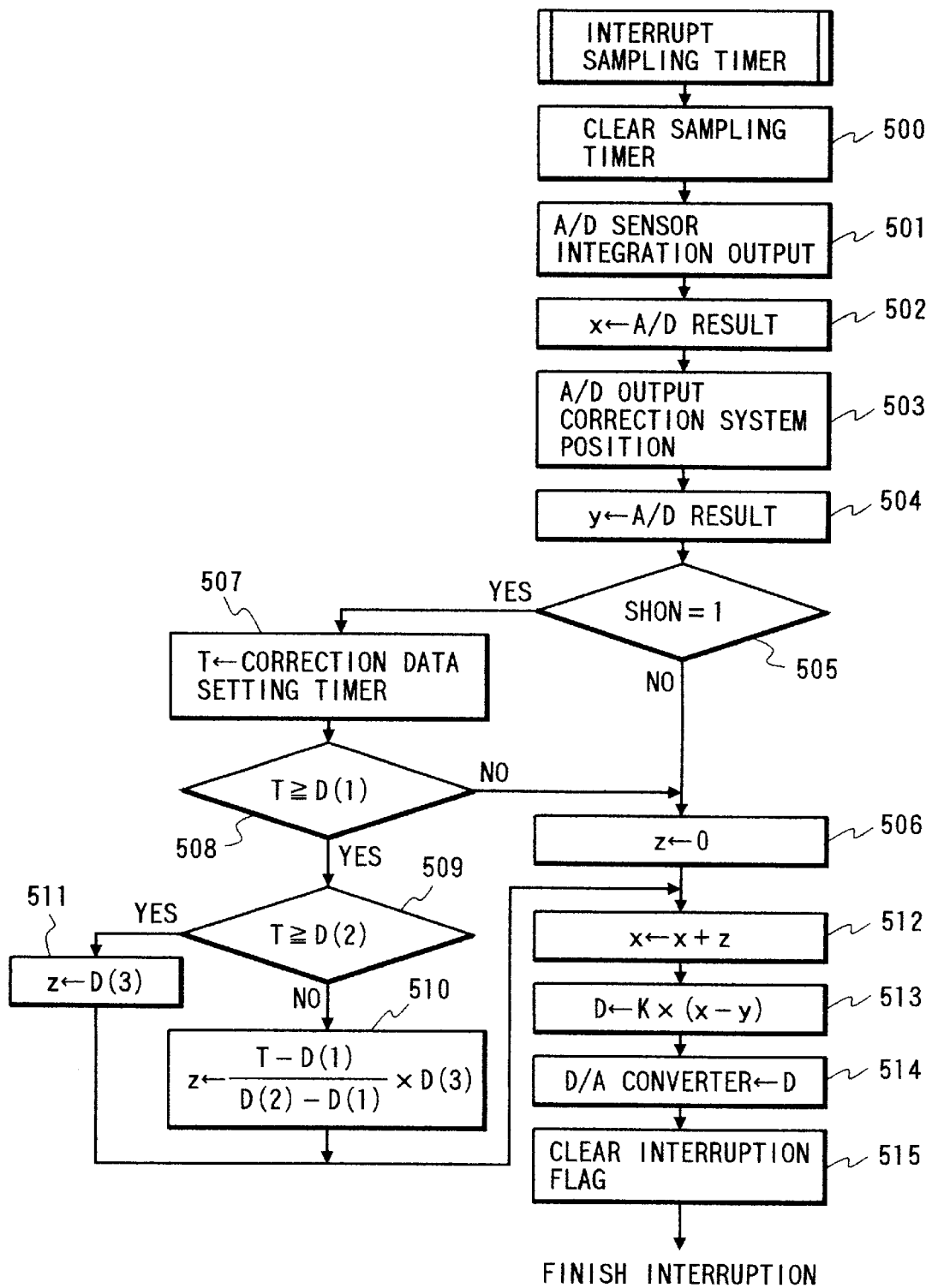
FIG. 14 is a flow chart showing the operation of the arrangement according to the third embodiment of the present invention.

When this communication interruption occurs, an operation is performed in accordance with the flow chart of FIG. 13. In step 450, data input via an SDI line is set in a register A. It is then checked whether the value of an internal latch DTL is "1". If this value is "0", the flow advances to step 452 to check whether the value of the register A is predetermined data 01. In this case, since A=01, the flow advances to step 453 to set the internal flag SW1ON to "1". In step 467, this serial interruption flag is cleared to terminate the interruption operation.

When this state is set, therefore, since SW1ON=1 in step 401 in FIG. 12, the flow advances to step 402 to start energizing the sensors 304 and 305 in FIG. 9.

In step 403, the correction system (driving circuits 313 and 314 and the position detection sensors 315 and 316) in FIG. 9 is energized. In step 404, a sampling timer (not shown) is cleared and started to A/D-convert outputs from the sensors 304 and 305 and the correction system at a predetermined period and load the resultant data.

In step 405, the mechanical lock mechanism 317 in FIG. 9 is operated and released to start a correction operation of the correction system. An interruption operation based on the sampling timer started in step 404 will be described below with reference to the flow chart of FIG. 14.

This sampling timer interruption processing is performed at a predetermined period based on the internal timer of the CPU 311 during the execution of the processing in the main flow chart of FIG. 12. In step 500, the sampling timer is cleared to "0" to generate the next interruption timing. In step 501, an integration output from the sensor 304 or 305 is A/D-converted by the A/D converter 318. In step 502, the resultant data is set in an internal register x.

In step 503, correction system position output signals from the position detection sensors 315 and 316 are A/D-converted by the A/D converter 318. In step 504, the resultant data are set in an internal register y. In step 505, the state of an internal latch SHON is determined. If this latch is still cleared (predetermined communication has not been performed yet in the flow chart of FIG. 13, and an actual shutter fluctuation correction timing has not come yet), the flow advances to step 506 to clear a register z, in which data to be added to outputs from the position detection sensors 315 and 316 is set, to "0".

In step 512, the values of the registers x and z are added together and set in the register x again (in this case, since the contents of the register z are "0", this operation has no meaning). Thereafter, in step 513, a value obtained by subtracting the value of a register y from the value of the register x is multiplied by a predetermined constant K, and the resultant data is set in a register D.

In step 514, the contents of the register D are input to the driving circuit 313 or 314 of the correction optical system 309 via the D/A converter 312, and the correction optical system 309 is driven by predetermined driving power. Thereafter, in step 515, the timer interruption flag is cleared to terminate this sampling timer interruption operation. In the above operation, the difference between a sensor output and a current correction system position output is amplified at a predetermined magnification, and feedback control is performed such that the sensor output is always kept equal to the correction system position output.

If, therefore, a sensor output per unit detection angle is set to be equal to a correction system output per unit correction angle, more accurate fluctuation correction can be realized by driving the correction system in accordance with the above fluctuation sensor output.

After an image blur prevention command is sent from the camera body 301, shutter fluctuation correction data including "02" as a command and 3-byte data is sent from the camera body 301 via a shutter fluctuation information output means incorporated in the CPU 302, as indicated by the timing charts of FIGS. 15A to 15C. These communication data are set in a predetermined memory in the CPU 311 during the execution of the serial communication interruption operation in FIG. 13. In this case, in step 450, the contents of serial data SDI are transferred to the register A.

In step 451, the state of the internal latch DTL is determined. Since this latch is still kept to "0", the flow advances to step 452. In this case, the command data "02" is set in the register A, as shown in FIGS. 15A to 15C, the flow advances to step 456. In step 457, the internal latch DTL is set to terminate the initial communication interruption processing.

After the command data is loaded, actual shutter fluctuation correction data is set in the subsequent serial communication interruption operation as follows. First of all, in step 450, data T1 from the serial communication line SDI is transferred to the register A. In step 451, the value of the internal latch DTL is then determined. In this case, since DTL=1 in the previous processing of receiving the command "02", the flow advances to step 462.

In step 462, the value of an internal counter N (initial value N=0) is incremented by one. In step 463, the value of the first shutter fluctuation correction data T1 set in the register A is set in a predetermined memory D(N) (in this case, D(1)). In step 464, it is checked whether the value of the counter N has reached a predetermined value "3". The above operation is repeated every time serial communication interruption occurs until the value of the counter N reaches "3".

As a result, shutter fluctuation correction timing data T1, T2, and L following the command "02" shown in FIGS. 15A to 15C are respectively set in predetermined memories D(1), D(2), and D(3). After the final data L is set in the memory D(3), since N=3 in step 464, the counter is reset to "0" in step 465. In step 466, the internal latch DTL is cleared to "0". With this operation, loading of the shutter fluctuation correction data from the camera body 301 side into the lens side is completed.

As described above, following the image blur prevention start command corresponding to SW1 of the camera, control parameters unique to the camera body which are set for the sensor or the correction system to perform accurate fluctuation correction with respect to a shutter fluctuation in an actual film exposure operation are transmitted from the camera body 301 to the interchangeable lens 308. While only the SW1 of the camera body is ON but the SW2 is not ON, the internal latch SHON is still cleared to "0" in step 406 in FIG. 12. In step 408, therefore, the above timer in the CPU 311 which is used to set shutter fluctuation correction data is stopped/cleared. The flow then returns to step 406 via step 409.

When the SW2 of the camera body 301 is turned on to start an actual shutter release sequence, command data "03" is immediately sent from the camera body 301 side via the shutter timing output means incorporated in the CPU 302 and the serial interface at the timings shown in FIGS. 15A to 15C. With this communication operation, in the CPU 311 on the interchangeable lens 308 side, in the process of the serial communication interruption operation shown in FIG. 13, the flow advances to steps 450, 451, 452, 454, 456, and 458 in this order. Thereafter, since the contents of the register A coincide with the command "03", the internal latch SHON is set to "1" in step 459 to terminate this interruption operation.

If it is determined in the main processing in FIG. 12 that the internal latch SHON is set to "1", the flow advances from step 406 to step 407. At this time, the correction data setting timer is started, a correction operation for the fluctuation sensor output is started, as will be described later. A control method based on addition of actual fluctuation correction data will be described with reference to the flow chart of FIG. 14.

As described above, in sampling timer interruption processing, when the timer is started in step 404, outputs from the sensors 304 and 305 and the position detection sensors 315 and 316 are loaded via the A/D converter 318 at a predetermined period, and a correction driving amount at this time is determined in accordance with the loaded data.

After a release sequence is started, and the SHON flag in the CPU 311 is set to "1", the flow branches from step 507 to step 511.

In step 507, the value of the correction data setting timer, which has started the counting operation from "0" in step 407, is set in the internal register T. In step 508, the contents of the internal register T, in which the value of this timer is set, is compared with the contents of the memory D(1), in which the predetermined time T1 is set. If it is determined that the value of the timer has not reached T1 (the value of the memory D(1)), since "0" is set in the register z in step 506, no correction data is set for the outputs from the main mirror mechanism 306.

If it is determined in step 508 that the value of the register T is equal to or larger than the value of the memory D(1), it is checked in step 509 whether the value of the register T is equal to or larger than the value of the time data T2. If YES in step 509, since the value of the timer has not reached the time data T2 (the value of the memory D(2)), the result obtained by subtracting the value of the memory D(1) (i.e., T1) from the value of the register T is divided by the result obtained by subtracting the value of the memory D(1) (i.e., T1) from the value of the memory D(2) (i.e., T2), and the result is multiplied by the value of the memory D(3) (i.e., L). The resultant data is then set in the register z.

After the lapse of T1 of the timer, the value corresponding to this correction data becomes relatively large, together with the value of the timer. When the value of the register T becomes equal to or larger than the value of the memory D(2) in step 509, the fixed data of the memory D(3) is set in the register z. After the lapse of T2 of the timer, the correction data is fixed to level L.

FIGS. 15A to 15C are timing charts showing the timing of this operation. After reception of the command "03" from the camera body 301, the level of the correction data is kept at "0" for the predetermined time T1. The level of the correction data rises from "0" to "L" in the time interval between the end of the time T1 and the end of the time T2. After the time T2, the level of the data is fixed to level L.

Figure 16:
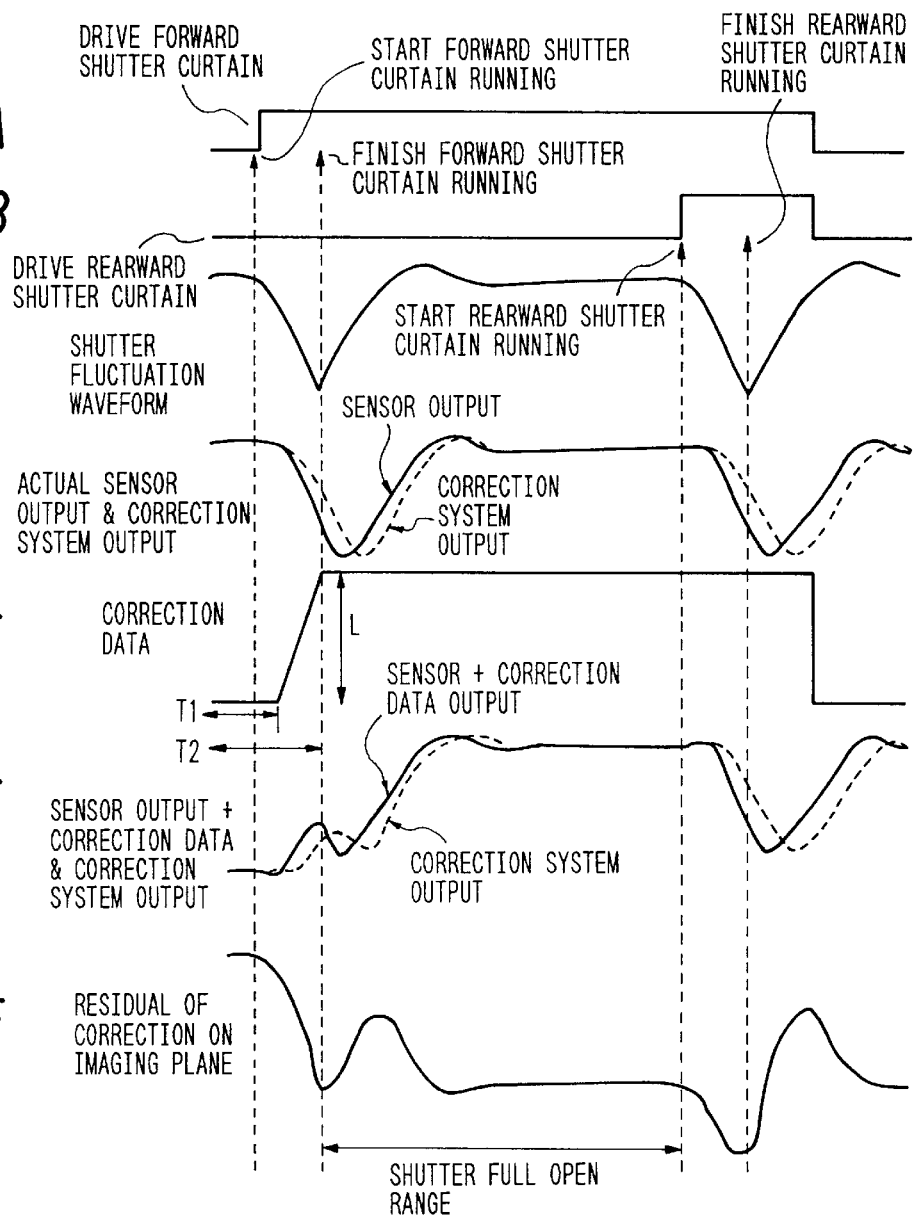
FIGS. 16A to 16G are timing charts showing operation of the arrangement according to the third embodiment of the present invention.

The manner of performing correction on the imaging plane in a case wherein this shutter fluctuation correction data is actually added to the sensor output will be described below with reference to the waveforms shown in FIGS. 16A to 16G. As in the prior art, FIGS. 16A, 16B, 16C, and 16D respectively show a forward shutter curtain driving waveform, a rearward shutter curtain driving waveform, a fluctuation waveform with respect to the absolute spaces of the camera and the lens which are produced when the shutter actually runs, and a sensor output upon a shutter fluctuation and an output from the correction system which is actually driven on the basis of the sensor output. The solid line in FIG. 16F indicates the result obtained by adding a correction data waveform like the one shown in FIG. 16E to the sensor output waveform. The dotted line in FIG. 16F indicates an output from the correction system actually driven on the basis of the addition result. FIG. 16G shows the state of the residual of correction on the imaging plane in a case wherein the correction operation of the correction system, indicated by the dotted line in FIG. 16F, is performed for the actual fluctuation waveform shown in FIG. 16C.

As is apparent from these waveforms, as compared with the residual of correction on the imaging plane in the prior art in FIG. 20E, the residual of correction on the imaging plane in a shutter full open state after rearward shutter curtain running decreases, although the residual of correction on the imaging plane in a shutter half open state until the finish of forward shutter curtain increases. As is apparent, in actual exposure on a film surface, since the fluctuation amount in the full open state is more influential, a residual of correction on the imaging plane in FIG. 16G is much smaller than that in the prior art in terms of fluctuation amount.

When the actual exposure operation is completed, as indicated by the timing charts of FIGS. 15A to 15C, a command "04" is transmitted from the camera body 301. Upon reception of this data, the CPU 311 on the interchangeable lens 308 side causes serial communication interruption, and the flow advances to steps 450, 451, 452, 454, 456, 458, 460 and 461 in this order. In step 461, the internal latch SHON is cleared. When this latch SHON is set to "0", since the register z is set to "0" in step 506, no shutter fluctuation correction data is set at this time. In the above manner, shutter fluctuation correction on the lens side with the execution of the shutter exposure sequence is completed.

While the internal latch SW1ON is set to "1" in step 409 in the main flow chart of FIG. 12, the flow returns to step 406 again. For this reason, when the internal latch SHON is set to "1", setting of shutter fluctuation correction like the one described above is performed again. When the photographer completes a release button operation on the camera body 301 side, and the camera SW1 is turned off, a command "00" (not shown in the timing charts of FIGS. 15A to 15C) is transmitted from the camera body 301 side to the interchangeable lens 308. When the CPU 311 on the interchangeable lens 308 side receives this command, the flow advances to steps 450, 451, 452, 454, and 455 in the serial communication interruption processing in this order. As a result, the internal latch SW1ON is cleared to "0".

If it is detected in step 409 in the main flow chart of FIG. 12 that the SW1ON is set to "0", the mechanical lock mechanism 317 is energized. As a result, the mechanical lock mechanism 317 in FIG. 9 operates to completely stop the movement of the correction optical system 309. In step 411, energization to the circuits 313, 314, 315, and 316 of the correction system is stopped. After energization to the sensors 304 and 305 is stopped in step 412, the counting operation of the sampling timer is stopped in step 413.

As described above, in this embodiment, a shutter fluctuation waveform determined by physical data such as the overall weight of the camera body in which the interchangeable lens is mounted, the curtain travel of the shutter, and the weight of the shutter is transmitted in the form of timing data and its level data from the camera body 301 side to the interchangeable lens 308 side. With this method, even if a different type of camera body is used, optimal shutter fluctuation correction for the camera body can always be realized by changing the above data. In addition, in this embodiment, shutter fluctuation correction is performed to linearly increase in correction amount from a given timing such that the number of data to be transferred is minimized. If, however, the number of data to be transferred is increased, more accurate correction (e.g., the gradient of a straight line changes with time) can be performed.

In addition, the present invention may be applied to a case wherein cameras of the same type have different characteristics associated with vibrations generated when the shutters run.

Fourth Embodiment

Figure 17:
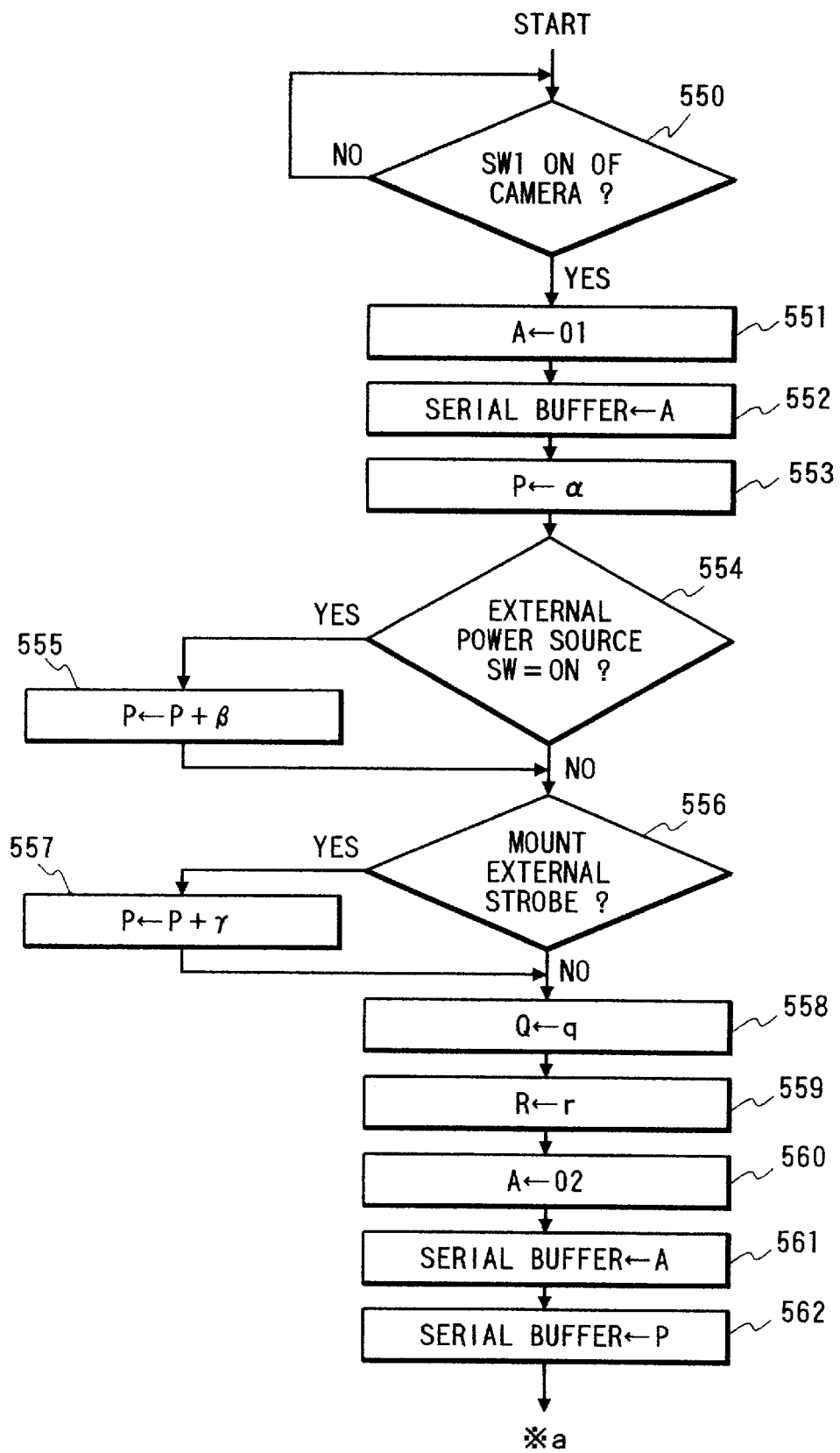
FIG. 17 is a flow chart showing the operation of an arrangement according to the fourth embodiment of the present invention.
Figure 18:
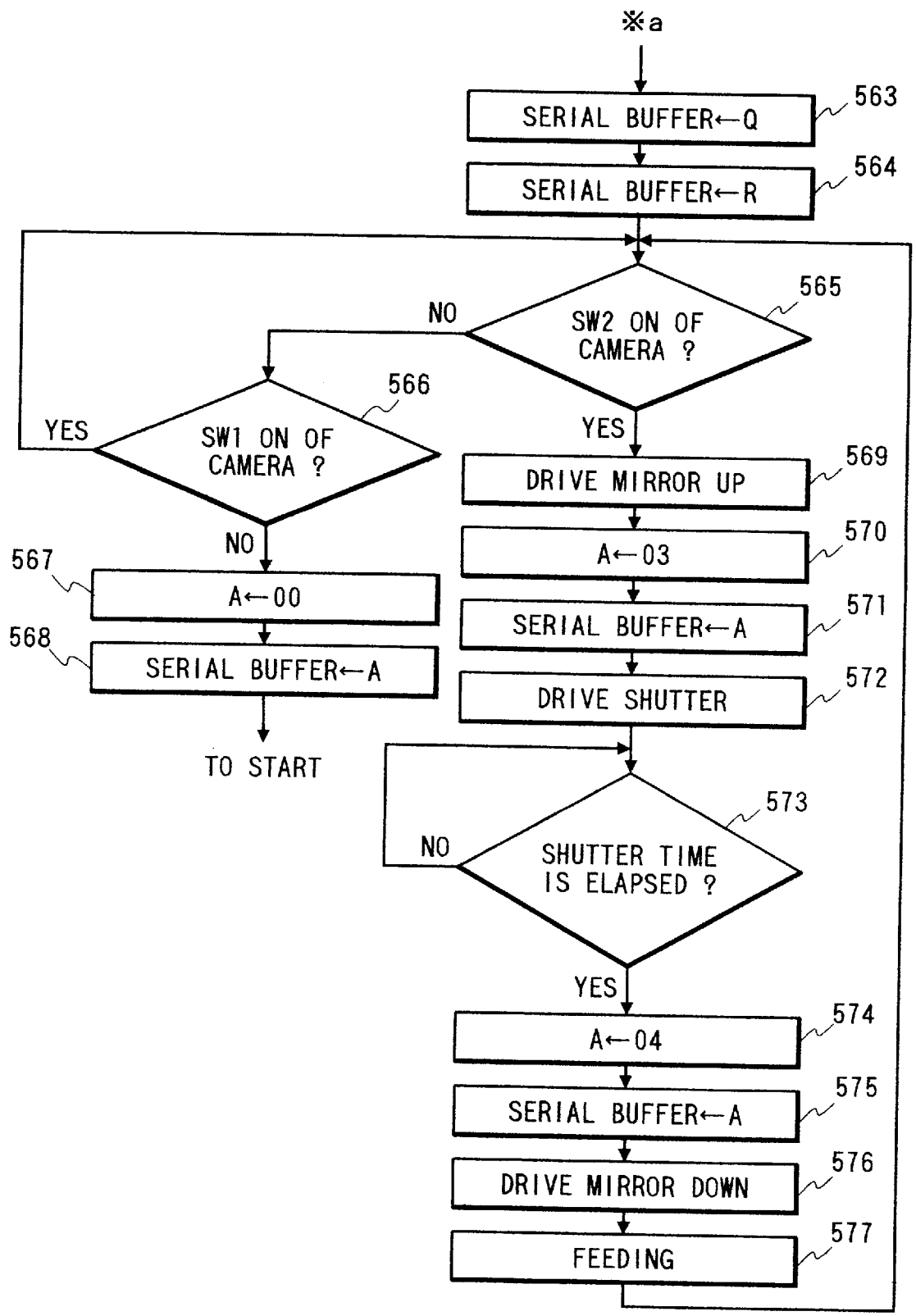
FIG. 18 is a flow chart showing the operation of the arrangement according to the fourth embodiment of the present invention.
Figure 19:
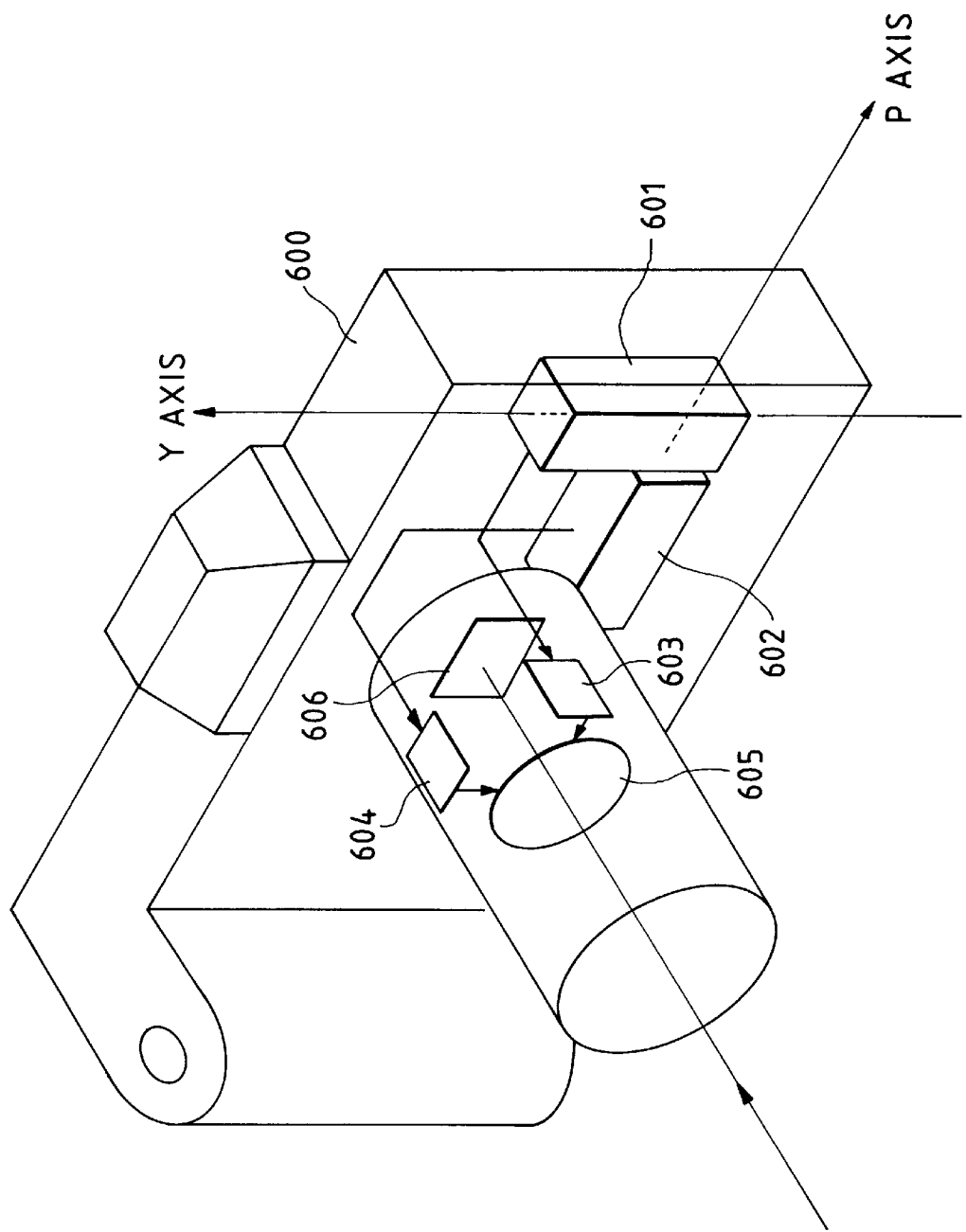
FIG. 19 is a perspective view schematically showing a conventional camera having an image blur prevention function.

The operation of the fourth embodiment of the present invention will be described with reference to the flow charts of FIGS. 17 and 18. FIGS. 17 and 18 explain the operation of a CPU 302 on the camera body side.

In step 550, it is checked whether a SW1 is turned on by a camera release operation (not shown). If YES in step 550, a command "01" for starting an image blur prevention operation on the lens side is transmitted via a serial interface in steps 551 and 552. As described above, upon reception of this command, energizing and driving operations for a fluctuation sensor and a correction optical system are started on the interchangeable lens side.

In step 553, a constant value α corresponding or proportional to the weight of a camera body 301 is set in a register P in the CPU 302. In step 554, it is checked on the basis of the state of a switch 325 whether an external power source 303 such as the motor driver also serving as an external power source in FIG. 9 is mounted. If NO in step 554, the flow advances to step 556. If YES in step 554, a constant value β corresponding or proportional to the weight of the external power source 303 is added to the value of the register P in step 555. The resultant data is set in the register P.

In step 556, on the basis of a result of communication with a CPU 327 (connected to the camera body via a contact piece portion 328) for controlling an external strobe 326, it is checked whether the external strobe 326 in FIG. 9 is mounted. If NO in step 556, the flow advances to step 558. If YES in step 556, a constant value y corresponding or proportional to the weight is added to the value of the register P in step 557. The resultant value is set in the register P. When it is determined in this manner that the integration circuit 3 or the external strobe 326 is mounted on the camera body 301, constant value data corresponding or proportional to the total weight of the camera body 301 is set in the register P.

In step 558, a constant value q corresponding or proportional to the weight of the shutter curtains of a shutter 323 in FIG. 9 is set in a register Q. In step 559, constant value data r corresponding or proportional to the curtain travel (generally, several msec, which corresponds to a value unique to the shutter incorporated in the camera) of the shutter is set in a register R.

In steps 560 to 564, upon transmission of a command "02", the values of the registers P, Q, and R are transmitted to a CPU 311 on the lens side via a serial interface. As described in the third embodiment, upon reception of this data, the CPU 311 on the interchangeable lens 308 side adds the weight of the interchangeable lens 308 side to the total weight of the camera body 301. In general, the mechanism of a fluctuation caused by an operation of the shutter is established from the action/reaction relationship between the shutter curtains and the overall camera, and is defined by a fluctuation amplitude (shutter curtain weight/total weight of (camera+lens)) and a fluctuation frequency (1/curtain travel of shutter).

On the interchangeable lens side, a shutter fluctuation waveform can be estimated from the above information from the camera body 301 side, and shutter fluctuation correction data like the one shown in FIG. 16E is determined (in practice, correction data must be determined in consideration of a fluctuation signal detected by a sensor with a delay). Steps 565 to 577 explain processing associated with a release sequence on the camera body 301 side. Since this processing is not highly relevant to this embodiment, a description thereof will be omitted.

As described above, in this embodiment, information associated with a shutter fluctuation is transmitted from the camera body side to the interchangeable lens side in accordance with the state of the camera, and is combined with information on the interchangeable lens side thereon, thereby creating optimal shutter fluctuation correction data.

As described above, in this embodiment, shutter fluctuation correction is performed by transmitting information associated with correction waveform data for correcting a shutter fluctuation from the camera body side to the interchangeable lens side. With this operation, optimal shutter fluctuation correction, especially shutter fluctuation correction in an exposure operation, is always realized regardless of the type of a camera body. Every time the state of the camera body side changes (for example, when an external device such as an accessary is mounted, the total weight of the camera changes), changed information on the camera body side is transmitted to the interchangeable lens side, and this information is combined with information unique to the interchangeable lens side, thereby creating optimal fluctuation correction data on the interchangeable lens side. With this operation, more accurate shutter fluctuation correction is realized from the viewpoint of the overall camera.

According to the arrangements of the third and fourth embodiments, in an interchangeable lens type camera system, image blur caused by hand fluctuation is properly corrected, together with correction of shutter fluctuation correction, regardless of the form of a combination of the interchangeable lens and the camera body and the type of shutter mechanism, thereby realizing an interchangeable lens and a camera system having the interchangeable lens which can easily obtain high-quality images.

In each embodiment described above, stoppage of each shutter curtain is predicted on the basis of time information. However, the actual movement of each shutter curtain may be directly detected, and generation or a change in the state of a signal for correcting a fluctuation sensor output may be controlled on the basis of the detection result.

Each embodiment described above exemplifies the countermeasures against a fluctuation caused by the driving operation of the focal-plane photographic shutter. However, countermeasures against other mechanisms of causing fluctuations may be provided. For example, countermeasures against the influences of the driving operations of a different type of shutter, the quick return mirror of a single-lens reflex camera, and a film feed mechanism may be provided. In this case as well, the manner of handling a fluctuation may be changed (for example, the waveform of fluctuation sensor output correction data or the generation timing may be changed as in the second embodiment) in accordance with the driven state of a mechanism causing the fluctuation.

In the present invention, as fluctuation detection means, any meter, e.g., an angular acceleration meter, an acceleration meter, an angular velocity meter, a velocity meter, an angular displacement meter, or a displacement meter can be used as long as it can detect a fluctuation.

In the present invention, as image blur prevention means, any means other than a shift optical system for moving an optical member within a plane perpendicular to an optical axis can be used as long as it can prevent an image blur can be used. For example, a light beam changing means such as a variable angle prism, a means for moving a photographing plane within a plane perpendicular to the optical axis, or means for correcting a fluctuation by image processing may be used.

The present invention is not limited image blur prevention means designed to directly prevent an image blur. For example, the present invention may use means for warning the user the presence of a fluctuation by using light, a sound, or the like, thereby indirectly preventing fluctuation.

The present invention can be applied to a single-lens reflex camera, a lens shutter camera, a video camera, an optical device or apparatus other than a camera. In addition, the present invention can be applied as a constituent unit.

In the present invention, the arrangements or some parts thereof corresponding to the respective claims or embodiments may be arranged in separate units. For example, a fluctuation detection device may be arranged in the camera body; a fluctuation correction device, in a lens barrel mounted in the camera; and a control device for controlling these devices, in an intermediate adaptor.

As has been described above, according to each embodiment of the present invention, a signal stored in storing means for storing a signal corresponding to the fluctuation state of an equipment in a predetermined state is added to an output from a fluctuation detection device to form a signal for operating image blur prevention means. Even if proper image blur prevention cannot be performed by using an output from the fluctuation detection means alone, e.g., a fluctuation having a frequency equal to or higher than the frequency at which the fluctuation detection means cannot properly detect a fluctuation, proper image blur prevention can be performed.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus for preventing image blur and adapted for use with a camera including a movable member and an operation portion that performs a predetermined operation for moving the movable member, said apparatus comprising:
    a fluctuation detection device that detects a fluctuation of the apparatus;
    a memory that stores a predetermined signal;
    signal forming means for forming a driving signal for driving an image blur correction means in accordance with an output of said fluctuation detection device and a signal stored in said memory;
    timing means for measuring an elapsed time in response to the predetermined operation of the operation portion of the camera for moving the movable member; and
    control means for controlling a signal forming operation of said signal forming means in accordance with the elapsed time measured by said timing means.

2. An apparatus according to claim 1, wherein the movable member includes a shutter, and the predetermined operation of said operation portion includes a release operation of the camera.

3. An apparatus according to claim 2, wherein the movable member includes a focal plane shutter.

4. An apparatus according to claim 1, wherein said signal forming means includes means for forming said driving signal by adding the output from the fluctuation detection device to the predetermined signal stored in said memory.

5. An image blur prevention apparatus adapted for use with a camera including a movable member and an operation portion that performs a predetermined operation for moving the movable member, said apparatus comprising:
    an image blur correction device that corrects image blur;
    a fluctuation detection device that detects a fluctuation of the apparatus;
    a memory that stores a predetermined signal;
    signal forming means for forming a driving signal for driving said image blur correction device in accordance with an output of said fluctuation detection device and the predetermined signal stored in said memory;
    timing means for measuring an elapsed time in response to the predetermined operation of the operation portion of the camera for moving the movable member; and
    control means for controlling a signal forming operation of said signal forming means in accordance with the elapsed time measured by said timing means.

6. An apparatus for preventing image blur and adapted for use with an optical equipment including a movable member and an operation portion that performs a predetermined operation for moving the movable member, said apparatus comprising:
    a fluctuation detection device that detects a fluctuation of the apparatus;
    a memory that stores a predetermined signal;
    signal forming means for forming a driving signal for driving an image blur correction means in accordance with an output of said fluctuation detection device and the predetermined signal stored in said memory;
    timing means for measuring an elapsed time in response to the predetermined operation of the operation portion of the optical equipment for moving the movable member; and
    control means for controlling a signal forming operation of said signal forming means in accordance with the elapsed time measured by said timing means.

7. An apparatus according to claim 1, wherein said control means includes means for controlling a timing of said signal forming operation using the predetermined signal stored in said memory in accordance with the elapsed time measured by said timing means.

8. An apparatus according to claim 7, wherein said control means includes means for causing said signal forming means to start a signal forming operation by adding the output of said fluctuation detection device to the predetermined signal stored in said memory at a timing when said timing means measures a predetermined time from the start of operation of said operation portion.

9. An apparatus according to claim 7, wherein said memory includes means for storing a predetermined signal having a value which varies at a predetermined rate.

10. An apparatus according to claim 9, wherein said memory includes means for storing a predetermined signal having a value which increases monotonously in at least a predetermined period.

11. An apparatus according to claim 9, wherein said control means includes means for varying a maximum amount of variation of the predetermined signal stored in said memory in accordance with the elapsed time measured by said timing means.

12. An apparatus according to claim 11, wherein said control means includes means for holding the variable, predetermined signal stored in said memory substantially at a constant value when said timing means measures a predetermined time from the start of operation of said operation portion.

13. An apparatus according to claim 7, wherein said control means includes means for varying a timing of performing said signal forming operation using the predetermined signal stored in said memory in accordance with the elapsed time measured by said timing means.

14. An apparatus according to claim 8, wherein said control means includes means for varying a timing for performing said signal forming operation in accordance with a shutter speed of the camera, zooming information, focusing information, a diaphragm value or a signal transmitted from the camera.

15. An apparatus according to claim 1, wherein said memory includes means for outputting a predetermined wave-formed signal as a memory signal and said control means includes means for varying a wave form of said predetermined wave-form signal in accordance with a shutter speed of the camera, zooming information, focusing information, a diaphragm value or a signal transmitted from the camera.

16. An apparatus for preventing image blur and adapted for use with a camera including a movable member, said apparatus comprising:

a fluctuation detection device that detects a fluctuation of said apparatus;

a memory that stores a signal, the value of which increases or decreases substantially monotonously; and signal forming means for forming a driving signal for driving image blur correction means for correcting image blur in accordance with an output of said fluctuation detection device and a signal stored in said memory, the signal stored in said memory being used for a signal forming operation performed at a timing corresponding to a movement of said movable member, and including substantially no element reverse to a monotonous increasing or decreasing variation of the signal value.

17. An apparatus according to claim 16, wherein said memory includes means for storing two parameters such as a time and an amplitude of the signal.

18. An apparatus according to claim 16, wherein said memory includes means for outputting a stored signal in accordance with a timing operation of a predetermined timing device.

19. An apparatus according to claim 18, wherein said predetermined timing device includes means for performing a timing operation in accordance with a predetermined operation of an operation portion for moving said movable member.

20. An apparatus according to claim 18, wherein said memory includes means for starting an output of the stored signal, the value of which is in a predetermined range of monotonous variation, to said signal forming means when said timing device measures a predetermined time.

21. An apparatus according to claim 20, wherein said memory includes means for stopping the output of the signal, the value of which is in the predetermined range of monotonous variation, and for starting an output of a signal having a value that is substantial constant when said timing means measures a second time, longer than said predetermined time.

22. An apparatus according to claim 16, wherein said movable member includes a shutter.

23. An apparatus according to claim 22, wherein said movable member includes a focal plane shutter.

24. An apparatus according to claim 23, wherein said focal plane shutter includes a leading curtain and a trailing curtain and said memory includes means for outputting the signal, the value of which is in said predetermined range of variation when said leading curtain is being driven.

25. An apparatus according to claim 16, wherein said signal forming means includes means for forming said driving signal by adding the output of said fluctuation detection device to a predetermined signal stored in said memory.

26. An apparatus according to claim 18, wherein said memory includes means for varying an output timing of said stored signal.

27. An apparatus according to claim 26, wherein said memory includes means for varying the output timing of said stored signal in accordance with a shutter speed of the camera, zooming information, focusing information, a diaphragm value or a signal transmitted from the camera.

28. An apparatus according to claim 16, wherein said memory includes means for varying a wave form of an output signal in accordance with a shutter speed of the camera, zooming information, focusing information, a diaphragm value or a signal transmitted from the camera.

29. An image blur prevention apparatus adaptable to a plurality of kinds of cameras, said apparatus comprising:

a fluctuation detection device that detects a fluctuation of said apparatus;

signal output means for outputting a signal having a predetermined wave form;

driving signal forming means for outputting a driving signal for driving an image blur correction means in accordance with an output of said fluctuation detection device and an output signal of said signal output means;

signal receiving means for receiving a signal transmitted from a camera; and varying means for varying a wave form or a timing of a signal output from said signal output means in accordance with the signal received by said signal receiving means.

30. An apparatus according to claim 29, wherein said varying means includes means for varying a timing at which said signal output means starts to output the signal having said predetermined wave form.

31. An apparatus according to claim 29, wherein said driving signal forming means includes means for causing an operation state thereof to be selectable between a first state in which the driving signal responsive to the output of said fluctuation detection device but unresponsive to the output signal of said signal output means is output and a second state in which the driving signal responsive to both of the output of said fluctuation detection device and the output signal of said signal output means is output.

32. An apparatus according to claim 31, wherein said varying means includes means for varying a timing at which said driving signal forming means changes the operation state from said first state to said second state by varying said signal output start timing of said signal output means.

33. An apparatus according to claim 29, wherein said varying means includes means for varying a varying ratio of the signal having said predetermined wave form output from said signal output means.

34. An apparatus according to claim 29, wherein said varying means includes means for varying a timing at which the varying ratio of the signal having said predetermined wave form output from said signal output means is varied.

35. An apparatus according to claim 29, wherein said signal output means includes means for outputting a signal having a wave form or a timing in accordance with a predetermined parameter.

36. An apparatus according to claim 35, wherein said varying means includes means for varying said parameter in accordance with the signal received by said signal receiving means.

37. An apparatus according to claim 35, wherein said signal output means includes timing means and means for outputting a signal in accordance with said parameter and a measured time of said timing means.

38. An apparatus according to claim 29, wherein said signal receiving means includes means for receiving plural kinds of signals transmitted from the camera, and said varying means includes means for varying said wave form or said timing in accordance with said plural kinds of signals.

39. An apparatus according to claim 29, wherein said driving signal forming means includes means for starting to form a driving signal in accordance with the outputs of said fluctuation detection device and said signal output means, both signals being responsive to a predetermined signal transmitted from the camera.

40. An apparatus according to claim 39, wherein said signal output means includes means for starting to output the signal having said predetermined wave form in accordance with said predetermined signal transmitted from the camera.

41. An apparatus according to claim 39, wherein said varying means includes means for determining said wave form or said timing in accordance with a signal transmitted from the camera before said predetermined signal.

42. An apparatus according to claim 39, wherein said driving signal forming means includes means for starting to form a driving signal in accordance with the outputs of said fluctuation detection device and said signal output means, both signals being responsive to a predetermined signal transmitted from the camera in accordance with a shutter release operation of the camera.

43. An apparatus according to claim 42, wherein said driving signal forming means includes means for starting to form a driving signal in accordance with the outputs of said fluctuation detection device and said signal output means, both signals being responsive to a predetermined signal transmitted from the camera in accordance with a start of an actual shutter release sequence of the camera.

44. An apparatus according to claim 39, wherein said driving signal forming means includes means for starting to form a driving signal in accordance with the outputs of said fluctuation detection device and said signal output means, both signals being responsive to a predetermined signal transmitted from the camera in accordance with a predetermined operation of a release operation portion for causing the camera to release a shutter.

45. An apparatus according to claim 29, wherein said varying means includes means for determining said wave form or said timing in accordance with a signal transmitted from the camera, corresponding to a mounted state of accessories of the camera.

46. An apparatus according to claim 45, wherein said varying means includes means for determining said wave form or said timing in accordance with a signal transmitted from the camera, corresponding to a mounted state of an external power supply or a stroboscopic lamp apparatus of the camera.

47. An apparatus according to claim 29, wherein said driving signal forming means includes means for forming the driving signal by adding the output signals of said fluctuation detection device to the output signal of said signal output means.

48. An apparatus according to claim 1, wherein said timing means includes means for measuring a time in accordance with a start of a sequence for moving the movable member responsive to said predetermined operation.

49. An apparatus according to claim 48, wherein said movable member includes a shutter member and said timing means includes means for measuring a time in accordance with a start of an actual shutter release sequence of the camera, the start corresponding to an operation for performing a shutter release of a release operation portion.

50. An apparatus according to claim 1, further comprising:

image blur correction control means for starting a driving of said image blur correction means in response to the predetermined operation of the operation portion of the camera, the driving of said image blur correction means being in response to the driving signal formed in accordance with the output of said fluctuation detection device and the signal stored in said memory.

51. An apparatus according to claim 50, wherein said image blur correction control means includes changing means for changing a first state in which said image blur correction means is driven in response to the output of said fluctuation detection device but unresponsive to the signal stored in said memory to a second state in which said image blur correction means is driven in response to the driving signal formed by said signal forming means in accordance with the output of said fluctuation detection device and the signal stored in said memory.

52. An apparatus according to claim 50, wherein said image blur correction control means includes means for starting a driving of said image blur correction means in response to the driving signal formed by said signal forming means, in accordance with a start of a sequence for moving said movable member in response to the predetermined operation.

53. An apparatus according to claim 52, wherein said movable member includes a shutter member and said image blur correction control means includes means for starting a driving of said image blur correction means in response to the driving signal formed by said signal forming means, in accordance with a start of an actual shutter release sequence of the camera in response to operation for performing a shutter release of a release operation portion.

* * * * *

UNITED STATES PATENT AND TRADEMARK OFFICE
CERTIFICATE OF CORRECTION

PATENT NO : 6,035,133
DATED : March 7, 2000
INVENTOR(S): Yasuhiko Shiomi

It is certified that error appears in the above-identified patent and that said Letters Patent is hereby corrected as shown below:

Column 1
Line 20, "an" should be deleted.

Column 2
Line 15, "surface," should read -- surface; --.
Line 46, "thereto, the" should read -- thereto; the --.

Column 3,
Line 50, "in the" should read -- in a --.
Column 4
Line 63, "loaded" should read -- is loaded --.

Column 6,
Line 24, "equal" should read -- is equal --.
Line 26, "($>T_o$)." should read -- ($\geq T_o$) . -- and "No" should read -- NO --.
Line 49, "operation. As" should read -- operation, as --.
Line 51, "opening" should read -- open --.

Column 9
Line 1, "which is" should read -- are --.

Column 10
Line 48, "clocks" (both occurrences) should read -- clock pulses --.

Column 12
Line 57, "started," should read -- started, and --.

Column 14
line 43, "determined" should read -- is determined --.

Column 15
Line 50, "amplitude" should read -- amplitude $\propto$ --.
Line 51, "frequency" should read -- frequency $\propto$ --.

Column 16
Line 12, "accessary" should read -- accessory --.
Line 57, "an" should be deleted, and "blur can" should read -- blur. --.

UNITED STATES PATENT AND TRADEMARK OFFICE
CERTIFICATE OF CORRECTION

PATENT NO : 6,035,133
DATED : March 7, 2000
INVENTOR(S): Yasuhiko Shiomi

Page 2 of 2

It is certified that error appears in the above-identified patent and that said Letters Patent is hereby corrected as shown below:

Column 16 contd.
Line 58, "be used." should be deleted.
Line 63, "image" should read -- to image --.
Line 66, "user the" should read -- user of the --.

Column 17
Line 2, "an" should read -- or an --.

Column 19
Line 5, "claim 8," should read -- claim 7, --.
Line 58, "substantial" should read -- substantially --.

Signed and Sealed this

Seventh Day of August, 2001

Attest:

*Attesting Officer*

NICHOLAS P. GODICI
*Acting Director of the United States Patent and Trademark Office*